US010205584B2

(12) United States Patent
Zavadsky et al.

(10) Patent No.: US 10,205,584 B2
(45) Date of Patent: Feb. 12, 2019

(54) SYSTEMS AND METHODS FOR INTEGRATING ASYNCHRONOUS SIGNALS IN DISTRIBUTED ANTENNA SYSTEM WITH DIRECT DIGITAL INTERFACE TO BASE STATION

(71) Applicant: CommScope Technologies LLC, Hickory, NC (US)

(72) Inventors: Dean Zavadsky, Shakopee, MN (US); Philip M. Wala, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/727,469

(22) Filed: Oct. 6, 2017

(65) Prior Publication Data

US 2018/0034617 A1    Feb. 1, 2018

Related U.S. Application Data

(62) Division of application No. 14/506,441, filed on Oct. 3, 2014, now Pat. No. 9,787,457.

(Continued)

(51) Int. Cl.
*H04L 5/14* (2006.01)
*H04W 88/08* (2009.01)

(52) U.S. Cl.
CPC ............. *H04L 5/14* (2013.01); *H04W 88/085* (2013.01); *H04L 5/143* (2013.01); *H04L 5/1469* (2013.01)

(58) Field of Classification Search
CPC ...... H04W 88/085; H04L 5/14; H04L 5/1469; H04L 5/143
See application file for complete search history.

(56) References Cited

U.S. PATENT DOCUMENTS 4,183,054 A    1/1980  Patisaul et al.
4,451,916 A    5/1984  Casper et al.
(Continued)

FOREIGN PATENT DOCUMENTS

CA    2058736 A1    7/1993
CA    2069462 A1    7/1993
(Continued)

OTHER PUBLICATIONS

United States Patent and Trademark Office, "Restriction Requirement for U.S. Appl. No. 14/506,441", dated May 19, 2016, pp. 1-7, Published in: U.S.

(Continued)

*Primary Examiner* — Peter P Chau
(74) *Attorney, Agent, or Firm* — Fogg & Powers LLC

(57) ABSTRACT

A distributed antenna system (DAS) includes: signal interface units to receive downlink asynchronous radio carrier signals for radio frequency carriers from external device(s), each having a different clock, the signal interface units configured to: re-clock the downlink asynchronous radio carrier signals to a master clock of the DAS and convert the downlink asynchronous radio carrier signals to downlink digital signals; a host unit communicatively coupled to signal interface units and configured to combine at least two downlink digital signals into an aggregate downlink digital signal; an antenna unit coupled to the host unit and configured to: receive the aggregate downlink digital signal from the host unit, convert the aggregate downlink digital signal (s) and/or another signal based on the aggregate downlink digital signal into downlink radio frequency signals, and wirelessly transmit downlink radio frequency signals to a subscriber unit.

25 Claims, 17 Drawing Sheets

Related U.S. Application Data

(60) Provisional application No. 61/887,711, filed on Oct. 7, 2013.

(56) References Cited

U.S. PATENT DOCUMENTS

| | | |
|---|---|---|
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,377,255 A | 12/1994 | Beasley |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel et al. |
| 5,566,168 A | 10/1996 | Dent |
| 5,621,786 A | 4/1997 | Fischer et al. |
| 5,627,879 A | 5/1997 | Russell et al. |
| 5,634,191 A | 5/1997 | Beasley |
| 5,642,405 A | 6/1997 | Fischer et al. |
| 5,644,622 A | 7/1997 | Russell et al. |
| 5,657,374 A | 8/1997 | Russell et al. |
| 5,678,177 A | 10/1997 | Beasley |
| 5,682,256 A | 10/1997 | Motley et al. |
| 5,687,195 A | 11/1997 | Hwang et al. |
| 5,732,076 A | 3/1998 | Ketseoglou et al. |
| 5,761,619 A | 6/1998 | Danne et al. |
| 5,765,099 A | 6/1998 | Georges et al. |
| 5,781,541 A | 7/1998 | Schneider |
| 5,781,859 A | 7/1998 | Beasley |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,822,324 A | 10/1998 | Kostresti et al. |
| 5,845,199 A | 12/1998 | Longshore |
| 5,852,651 A | 12/1998 | Fischer et al. |
| 5,867,485 A | 2/1999 | Chambers et al. |
| 5,870,392 A | 2/1999 | Ann |
| 5,890,055 A | 3/1999 | Chu et al. |
| 5,907,544 A | 5/1999 | Rypinski |
| 5,914,963 A | 6/1999 | Basile |
| 5,924,022 A | 7/1999 | Beasley et al. |
| 5,987,014 A | 11/1999 | Magill et al. |
| 6,023,628 A | 2/2000 | Beasley |
| 6,034,950 A | 3/2000 | Sauer et al. |
| 6,108,113 A | 8/2000 | Fee |
| 6,108,550 A | 8/2000 | Wiorek et al. |
| 6,108,626 A | 8/2000 | Cellario et al. |
| 6,157,659 A | 12/2000 | Bird |
| 6,157,810 A | 12/2000 | Georges et al. |
| 6,188,693 B1 | 2/2001 | Murakami |
| 6,222,660 B1 | 4/2001 | Traa |
| 6,226,274 B1 | 5/2001 | Reese et al. |
| 6,246,675 B1 | 6/2001 | Beasley et al. |
| 6,373,887 B1 | 4/2002 | Aiyagari et al. |
| 6,377,640 B2 | 4/2002 | Trans |
| 6,498,936 B1 | 12/2002 | Raith |
| 6,567,473 B1 | 5/2003 | Tzannes |
| 6,667,973 B1 | 12/2003 | Gorshe et al. |
| 6,674,966 B1 | 1/2004 | Koonen |
| 6,704,545 B1 | 3/2004 | Wala |
| 6,729,929 B1 | 5/2004 | Sayers et al. |
| 6,768,745 B1 | 7/2004 | Gorshe et al. |
| 6,785,558 B1 | 8/2004 | Stratford et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,917,614 B1 | 7/2005 | Laubach et al. |
| 6,963,552 B2 | 11/2005 | Sabat, Jr. et al. |
| 7,127,175 B2 | 10/2006 | Mani et al. |
| 7,205,864 B2 | 4/2007 | Schultz, Jr. et al. |
| 7,215,651 B2 | 5/2007 | Millar |
| 7,289,972 B2 | 10/2007 | Rieser et al. |
| 7,313,415 B2 | 12/2007 | Wake et al. |
| 7,369,637 B1 | 5/2008 | Mauer |
| 7,688,135 B2 | 3/2010 | Kim et al. |
| 7,733,901 B2 | 6/2010 | Salkini et al. |
| 7,761,093 B2 | 7/2010 | Sabat et al. |
| 7,787,854 B2 | 8/2010 | Conyers et al. |
| 7,920,858 B2 | 4/2011 | Sabat et al. |
| 8,050,291 B1 | 11/2011 | Prasad et al. |
| 8,064,850 B2 | 11/2011 | Yang et al. |
| 8,149,950 B2 | 4/2012 | Kim et al. |
| 8,224,266 B2 | 7/2012 | Liu et al. |
| 8,274,332 B2 | 9/2012 | Cho et al. |
| 8,326,238 B2 | 12/2012 | Yang et al. |
| 8,346,091 B2 | 1/2013 | Kummetz et al. |
| 8,351,877 B2 | 1/2013 | Kim et al. |
| 8,380,143 B2 | 2/2013 | Yang et al. |
| 8,401,499 B2 | 3/2013 | Kim et al. |
| 8,467,747 B2 | 6/2013 | Kim et al. |
| 8,472,897 B1 | 6/2013 | Yang |
| 8,543,074 B1 | 9/2013 | Laporte |
| 9,787,457 B2 | 10/2017 | Zavadsky et al. |
| 2001/0036163 A1 | 11/2001 | Sabat et al. |
| 2001/0044292 A1 | 11/2001 | Jeon et al. |
| 2002/0142739 A1 | 10/2002 | Smith |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0043928 A1 | 3/2003 | Ling et al. |
| 2003/0203717 A1 | 10/2003 | Chuprun et al. |
| 2004/0010609 A1 | 1/2004 | Vilander et al. |
| 2004/0032354 A1 | 2/2004 | Knobel et al. |
| 2004/0037565 A1 | 2/2004 | Young et al. |
| 2004/0053602 A1 | 3/2004 | Wurzburg |
| 2004/0106387 A1 | 6/2004 | Bauman et al. |
| 2004/0106435 A1 | 6/2004 | Bauman et al. |
| 2004/0132474 A1 | 7/2004 | Wala |
| 2004/0198453 A1 | 10/2004 | Cutrer et al. |
| 2004/0203339 A1 | 10/2004 | Bauman |
| 2004/0203703 A1 | 10/2004 | Fischer |
| 2004/0219950 A1 | 11/2004 | Pallonen et al. |
| 2005/0111475 A1 | 5/2005 | Borkowski et al. |
| 2005/0147067 A1 | 7/2005 | Mani et al. |
| 2005/0201323 A1 | 9/2005 | Mani et al. |
| 2005/0250503 A1 | 11/2005 | Cutrer |
| 2006/0026017 A1 | 2/2006 | Walker |
| 2006/0066484 A1 | 3/2006 | Sayers |
| 2006/0094470 A1 | 5/2006 | Wake et al. |
| 2006/0121944 A1 | 6/2006 | Buscaglia et al. |
| 2006/0153070 A1 | 7/2006 | DelRegno et al. |
| 2006/0172775 A1 | 8/2006 | Conyers et al. |
| 2006/0193295 A1 | 8/2006 | White et al. |
| 2006/0209752 A1 | 9/2006 | Wijngaarden et al. |
| 2006/0233188 A1 | 10/2006 | Oliver et al. |
| 2007/0008939 A1 | 1/2007 | Fischer |
| 2007/0241812 A1 | 10/2007 | Yang et al. |
| 2008/0019427 A1 | 1/2008 | Riddle et al. |
| 2008/0174365 A1 | 7/2008 | Yang et al. |
| 2008/0181171 A1 | 7/2008 | Koziy et al. |
| 2008/0240164 A1* | 10/2008 | Zavadsky ............ H04J 3/0685 370/503 |
| 2008/0265996 A1 | 10/2008 | Kim et al. |
| 2008/0284509 A1 | 11/2008 | Kim et al. |
| 2009/0058477 A1* | 3/2009 | Curtis ................. H03K 5/1252 327/145 |
| 2009/0085658 A1 | 4/2009 | Liu et al. |
| 2009/0096521 A1 | 4/2009 | Liu et al. |
| 2009/0180426 A1 | 7/2009 | Sabat et al. |
| 2009/0285194 A1 | 11/2009 | Kim et al. |
| 2009/0307739 A1 | 12/2009 | Dean et al. |
| 2009/0316608 A1 | 12/2009 | Singh et al. |
| 2009/0316611 A1 | 12/2009 | Stratford et al. |
| 2010/0046494 A1 | 2/2010 | Palanki et al. |
| 2010/0177760 A1 | 7/2010 | Cannon et al. |

(56) References Cited

U.S. PATENT DOCUMENTS

| | | | |
|---|---|---|---|
| 2010/0215028 A1 | 8/2010 | Fischer | |
| 2010/0271957 A1 | 10/2010 | Stapleton et al. | |
| 2010/0278530 A1* | 11/2010 | Kummetz | H04W 88/085 398/41 |
| 2010/0296816 A1 | 11/2010 | Larsen | |
| 2011/0135308 A1* | 6/2011 | Tarlazzi | H04B 7/0413 398/79 |
| 2011/0143649 A1 | 6/2011 | Sabat, Jr. et al. | |
| 2011/0156815 A1 | 6/2011 | Kim et al. | |
| 2011/0158081 A1 | 6/2011 | Wang et al. | |
| 2011/0201368 A1* | 8/2011 | Faccin | H04B 7/0413 455/507 |
| 2011/0243291 A1* | 10/2011 | McAllister | H04J 3/0658 375/376 |
| 2011/0268449 A1 | 11/2011 | Berlin et al. | |
| 2012/0027145 A1* | 2/2012 | Uyehara | H04J 3/0685 375/356 |
| 2012/0039254 A1 | 2/2012 | Stapleton et al. | |
| 2012/0039320 A1 | 2/2012 | Lemson et al. | |
| 2012/0057572 A1 | 3/2012 | Evans et al. | |
| 2012/0069880 A1 | 3/2012 | Lemson et al. | |
| 2012/0093084 A1 | 4/2012 | Wala et al. | |
| 2012/0106657 A1* | 5/2012 | Fischer | H04B 7/2606 375/259 |
| 2012/0135695 A1 | 5/2012 | Yang et al. | |
| 2012/0147993 A1 | 6/2012 | Kim et al. | |
| 2012/0154038 A1 | 6/2012 | Kim et al. | |
| 2012/0155572 A1 | 6/2012 | Kim et al. | |
| 2012/0177026 A1* | 7/2012 | Uyehara | H04B 1/18 370/345 |
| 2012/0230382 A1 | 9/2012 | Kim et al. | |
| 2012/0263152 A1 | 10/2012 | Fischer et al. | |
| 2012/0281565 A1 | 11/2012 | Sauer | |
| 2012/0281622 A1 | 11/2012 | Saban et al. | |
| 2012/0314797 A1* | 12/2012 | Kummetz | H04L 27/34 375/295 |
| 2013/0009707 A1 | 1/2013 | Kim et al. | |
| 2013/0017863 A1 | 1/2013 | Kummetz et al. | |
| 2013/0077713 A1 | 3/2013 | Kim et al. | |
| 2013/0094612 A1 | 4/2013 | Kim et al. | |
| 2013/0107763 A1* | 5/2013 | Uyehara | H04B 7/024 370/278 |
| 2013/0114486 A1 | 5/2013 | Spedaliere et al. | |
| 2013/0114963 A1 | 5/2013 | Stapleton et al. | |
| 2013/0128810 A1 | 5/2013 | Lee et al. | |
| 2013/0136202 A1 | 5/2013 | Kummetz et al. | |
| 2013/0147550 A1 | 6/2013 | Yang et al. | |
| 2013/0188753 A1* | 7/2013 | Tarlazzi | H04B 7/024 375/299 |
| 2013/0272463 A1 | 10/2013 | Uyehara et al. | |
| 2014/0037027 A1 | 2/2014 | Haq | |
| 2014/0146797 A1 | 5/2014 | Zavadsky et al. | |
| 2014/0146906 A1 | 5/2014 | Zavadsky et al. | |
| 2015/0098372 A1 | 4/2015 | Zavadsky et al. | |
| 2018/0034530 A1* | 2/2018 | Tarlazzi | H04J 14/028 |

FOREIGN PATENT DOCUMENTS

| | | |
|---|---|---|
| CA | 2087285 A1 | 1/1994 |
| CA | 2138763 A1 | 1/1994 |
| CA | 2156046 A1 | 1/1995 |
| CA | 2128842 A1 | 1/1996 |
| CA | 2134365 A1 | 4/1996 |
| CA | 2125411 E | 6/1996 |
| CA | 2058737 | 3/1997 |
| CA | 2158386 A1 | 3/1997 |
| CA | 2168681 A1 | 8/1997 |
| CA | 2215079 A1 | 3/1999 |
| EP | 0391597 A2 | 10/1990 |
| EP | 0876073 A2 | 11/1998 |
| EP | 1214809 A1 | 6/2002 |
| GB | 2253770 A | 9/1992 |
| GB | 2289198 A | 11/1995 |
| GB | 2315959 A | 2/1998 |
| GB | 2320653 A | 6/1998 |
| JP | 2000333240 A | 11/2000 |
| JP | 2001197012 A | 7/2001 |
| JP | 2003023396 A | 1/2003 |
| JP | 2004180220 A | 6/2004 |
| JP | 2004194351 A | 7/2004 |
| WO | 9115927 A1 | 10/1991 |
| WO | 9413067 A1 | 6/1994 |
| WO | 9533350 A1 | 12/1995 |
| WO | 9628946 A1 | 9/1996 |
| WO | 9716000 A1 | 5/1997 |
| WO | 9732442 A1 | 9/1997 |
| WO | 9824256 A2 | 6/1998 |
| WO | 9937035 A1 | 7/1999 |
| WO | 0117156 A1 | 3/2001 |
| WO | 0174013 A2 | 10/2001 |
| WO | 0174100 A1 | 10/2001 |
| WO | 0182642 A1 | 11/2001 |
| WO | 03079645 A2 | 9/2003 |
| WO | 2008076432 A1 | 6/2008 |
| WO | 2009138876 A2 | 11/2009 |
| WO | 2009155602 A1 | 12/2009 |
| WO | 2012054553 A1 | 4/2012 |
| WO | 2012115843 A1 | 8/2012 |

OTHER PUBLICATIONS

"DigivanceTM, Indoor Coverage Solution", "www.adc.com", 2001, pp. 1-8, Publisher: ADC.

"Intel Heterogeneous Network Solution Brief", "Published as early as 2011", pp. 1-5, Publisher: Intel Corporation.

"Tektronix Synchronous Optical Network (SONET)", "http://www.iec.org/online/tutorials/sonet/topic03.html", Aug. 28, 2002, pp. 1-5, Publisher: International Engineering Consortium.

Chinese Patent Office, "First Office Action from CN Application No. 200680029629.2 dated Oct. 9, 2010", "from Foreign Counterpart of U.S. Appl. No. 11/150,820", dated Oct. 9, 2010, pp. 1-33, Published in: CN.

Chinese Patent Office, "Notification to Grant Patent Right for Invention from CN Application No. 200680029629.2 dated Mar. 2, 2012", "from Foreign Counterpart of U.S. Appl. No. 11/150,820", dated Mar. 2, 2012, pp. 1-4, Published in: CN.

Chinese Patent Office, "Second Office Action from CN Application No. 200680029629.2 dated Aug. 10, 2011", "from Foreign Counterpart of U.S. Appl. No. 11/150,820", dated Aug. 10, 2011, pp. 1-31, Published in: CN.

Chinese Patent Office, "Third Office Action from CN Application No. 200680029629.2 dated Nov. 16, 2011", "from Foreign Counterpart of U.S. Appl. No. 11/150,820", dated Nov. 16, 2011, pp. 1-10, Published in: CN.

European Patent Office, "Communication under Rule 71(3) EPC from EP Application No. 06772594.5 dated Sep. 13, 2012", "from Foreign Counterpart of U.S. Appl. No. 11/150,820", dated Sep. 13, 2012, pp. 1-40.

European Patent Office, "Extended European Search Report for EP Application No. 14852776.5", "Foreign counterpart to U.S. Appl. No. 14/506,441", dated May 12, 2017, pp. 1-12, Published in: EP.

European Patent Office, "Extended European Search Report from EP Application No. 11813094.7 dated Aug. 14, 2013", "from Foreign Counterpart of U.S. Appl. No. 12/845,060", dated Aug. 14, 2013, pp. 1-6, Published in: EP.

European Patent Office, "Office Action from EP Application No. 06772594.5 dated Apr. 14, 2008", "from Foreign counterpart of U.S. Appl. No. 11/150,820", dated Apr. 14, 2008, pp. 1-7, Published in: EP.

European Patent Office, "Office Action from EP Application No. 06772594.5 dated Nov. 12, 2010", "from Foreign counterpart of U.S. Appl. No. 11/150,820", dated Nov. 12, 2010, pp. 1-5, Published in: EP.

European Patent Office, "Office Action from EP Application No. 06772594.5 dated Nov. 3, 2011", "from Foreign counterpart of U.S. Appl. No. 11/150,820", dated Nov. 3, 2011, pp. 1-3, Published in: EP.

(56) References Cited

OTHER PUBLICATIONS

European Patent Office, "Office Action from EP Application No. 06772594.5 dated Oct. 5, 2009", "from Foreign counterpart of U.S. Appl. No. 11/150,820", dated Oct. 5, 2009, pp. 1-3, Published in: EP.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
International Preliminary Examining Authority, "International Preliminary Report on Patentability from PCT Application No. PCT/US2011/045495 dated Feb. 7, 2013", "from Foreign Counterpart of U.S. Appl. No. 12/845,060", dated Feb. 7, 2013, pp. 1-6, Published in: WO.
International Preliminary Examining Authority, "International Preliminary Report on Patentability from PCT Application No. PCT/US2006/022342 dated Dec. 27, 2007", "from Foreign Counterpart of U.S. Appl. No. 11/150,820", dated Dec. 27, 2007, pp. 1-9, Published in: WO.
International Searching Authority, "International Search Report and Written Opinion for Application Serial No. PCT/US2014/059372", "from Foreign Counterpart of U.S. Appl. No. 14/506,441", dated Jan. 12, 2015, pp. 1-11, Published in: WO.
International Searching Authority, "International Search Report and Written Opinion from PCT Application No. PCT/US2006/022342 dated Nov. 7, 2006", "from Foreign Counterpart of U.S. Appl. No. 11/150,820", dated Nov. 7, 2006, pp. 1-13, Published in: WO.
International Searching Authority, "International Search Report and Written Opinion from PCT Application No. PCT/US2011/045495 dated Feb. 17, 2012", "from Foreign Counterpart of U.S. Appl. No. 12/845,060", dated Feb. 17, 2012, pp. 1-9, Published in: WO.
International Searching Authority, "International Search Report and Written Opinion from PCT Application No. PCT/US2011/057575 dated Feb. 17, 2012", "from Foreign Counterpart of U.S. Appl. No. 12/913,179", dated Feb. 17, 2012, pp. 1-10, Published in: WO.
International Searching Authority, "International Search Report and Written Opinion from PCT Application No. PCT/US2013/071960 dated Mar. 14, 2014","from PCT Counterpart of U.S. Appl. No. 14/090,129", dated Mar. 14, 2014, pp. 1-13, Published in: WO.
International Searching Authority, "International Search Report and Written Opinion from PCT Application No. PCT/US2013/071967 dated Mar. 10, 2014", "from PCT Counterpart of U.S. Appl. No. 14/090,135", dated Mar. 10, 2014, pp. 1-9, Published in: WO.
International Searching Authority, "International Search Report and Written Opinion from PCT Application No. PCT/US2014/017643 dated Jun. 2, 2014", "from PCT Counterpart of U.S. Appl. No. 14/187,115", dated Jun. 2, 2014, pp. 1-16, Published in: WO.
Japan Patent Office, "Decision of Final Rejection from JP Application No. 2008-515931 dated Feb. 28, 2012", "from Foreign Counterpart of U.S. Appl. No. 11/150,820", dated Feb. 28, 2012, pp. 1-8, Published in: JP.
Japan Patent Office, "Notification of Reasons for Rejection from JP Application No. 2008-515931 dated Nov. 1, 2011", "from Foreign Counterpart of U.S. Appl. No. 11/150,820", dated Nov. 1, 2011, pp. 1-10, Published in: JP.

Korean Intellectual Property, "International Search Report and Written Opinion from PCT Application No. PCT/US2013/071977 dated Mar. 20, 2014", "from PCT Counterpart of U.S. Appl. No. 14/090,139", dated Mar. 20, 2014, pp. 1-14, Published in: WO.
Korean Patent Office, "Office Action from KR Application No. 2007-7030470 dated Sep. 17, 2012", "from Foreign Counterpart of U.S. Appl. No. 11/150,820", dated Sep. 17, 2012, pp. 1-5, Published in: KR.
State Intellectual Property Office of the People's Republic of China, "First Office Action for CN Application No. 201480065467.2 dated Jun. 1, 2018", "Foreign Counterpart to U.S. Appl. No. 14/506,441", dated Jun. 1, 2018, pp. 1-22, Published in: CN.
The International Bureau of WIPO, "International Preliminary Report on Patentability from PCT Application No. PCT/US2011/057575 dated May 10, 2013", "from PCT Counterpart of U.S. Appl. No. 12/913,179", dated May 10, 2013, pp. 1-7, Published in: WO.
U.S. Patent and Trademark Office, "Corrected Notice of Allowability and Interview Summary", "U.S. Appl. No. 12/845,060", dated Mar. 28, 2013, pp. 1-25.
U.S. Patent and Trademark Office, "Decision on Appeal", "U.S. Appl. No. 11/150,820", Nov. 19, 2012, pp. 1-6.
U.S. Patent and Trademark Office, "Examiner's Answer", "U.S. Appl. No. 11/150,820", dated Nov. 17, 2009, pp. 1-24.
U.S. Patent and Trademark Office, "Examiner's Answer", "U.S. Appl. No. 12/775,897", dated Jan. 4, 2013, pp. 1-30.
U.S. Patent and Trademark Office, "Final Office Action", "from U.S. Appl. No. 11/150,820", dated Feb. 6, 2014, pp. 1-20, Published in: US.
U.S. Patent and Trademark Office, "Final Office Action", "U.S. Appl. No. 11/150,820", dated Dec. 29, 2008, pp. 1-27.
U.S. Patent and Trademark Office, "Final Office Action", "U.S. Appl. No. 11/150,820", dated Sep. 27, 2007, pp. 1-25.
U.S. Patent and Trademark Office, "Final Office Action", "U.S. Appl. No. 12/775,897", dated May 7, 2012, pp. 1-26.
U.S. Patent and Trademark Office, "Notice of Allowance", "U.S. Appl. No. 12/845,060", dated Mar. 4, 2013, pp. 1-10.
U.S. Patent and Trademark Office, "Office Action", "from U.S. Appl. No. 13/914,838", dated Nov. 20, 2013, pp. 1-47, Published in: US.
U.S. Patent and Trademark Office, "Office Action", "U.S. Appl. No. 11/150,820", dated Mar. 16, 2007, pp. 1-21.
U.S. Patent and Trademark Office, "Office Action", "U.S. Appl. No. 11/150,820", dated Mar. 24, 2008, pp. 1-17.
U.S. Patent and Trademark Office, "Office Action", "U.S. Appl. No. 12/775,897", dated Dec. 28, 2011, pp. 1-29.
U.S. Patent and Trademark Office, "Office Action", "U.S. Appl. No. 12/845,060", dated Oct. 2, 2012, pp. 1-28.
U.S. Patent and Trademark Office, "Office Action", "U.S. Appl. No. 12/913,179", dated Mar. 18, 2013, pp. 1-49.
U.S. Patent and Trademark Office, "Pre-Appeal Brief Decision", "U.S. Appl. No. 12/775,897", dated Sep. 18, 2012, pp. 1-2.
United States Patent and Trademark Office, "Corrected Notice of Allowability for U.S. Appl. No. 14/506,441" dated Jul. 20, 2017, pp. 1-6, Published in: U.S.
United States Patent and Trademark Office, "Notice of Allowance for U.S. Appl. No. 14/506,441", dated Apr. 5, 2017, pp. 1-18, Published in: U.S.
United States Patent and Trademark Office, "Office Action for U.S. Appl. No. 14/506,441", dated Sep. 23, 2016, pp. 1-65, Published in: U.S.

\* cited by examiner

SYSTEMS AND METHODS FOR INTEGRATING ASYNCHRONOUS SIGNALS IN DISTRIBUTED ANTENNA SYSTEM WITH DIRECT DIGITAL INTERFACE TO BASE STATION

CROSS-REFERENCE TO RELATED APPLICATIONS

This application is a divisional of U.S. patent application Ser. No. 14/506,441 filed on Oct. 3, 2014 and entitled "SYSTEMS AND METHODS FOR INTEGRATING ASYNCHRONOUS SIGNALS IN DISTRIBUTED ANTENNA SYSTEM WITH DIRECT DIGITAL INTERFACE TO BASE STATION", which claims the benefit of U.S. Provisional Patent Application Ser. No. 61/887,711 filed on Oct. 7, 2013, all of which are hereby incorporated herein by reference.

BACKGROUND

Distributed Antenna Systems (DAS) are used to distribute wireless signal coverage into buildings or other substantially closed environments. The antennas are typically connected to a radio frequency (RF) signal source, such as a service provider's base station. Various methods of transporting the RF signal from the RF signal source to the antenna have been implemented in the art.

SUMMARY

A signal interface unit in a radio system includes an external device interface configured to receive a downlink asynchronous radio carrier signal for a radio frequency carrier from an external device; a clock conversion unit communicatively coupled to the external device interface and configured to re-clock the downlink asynchronous radio carrier signal to a master clock of the radio system from the clock of the external device; and an antenna side interface configured to communicate at least one of the re-clocked downlink asynchronous radio carrier signal and a downlink digitized radio frequency signal based on the re-clocked downlink asynchronous radio carrier signal to an antenna unit.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1:
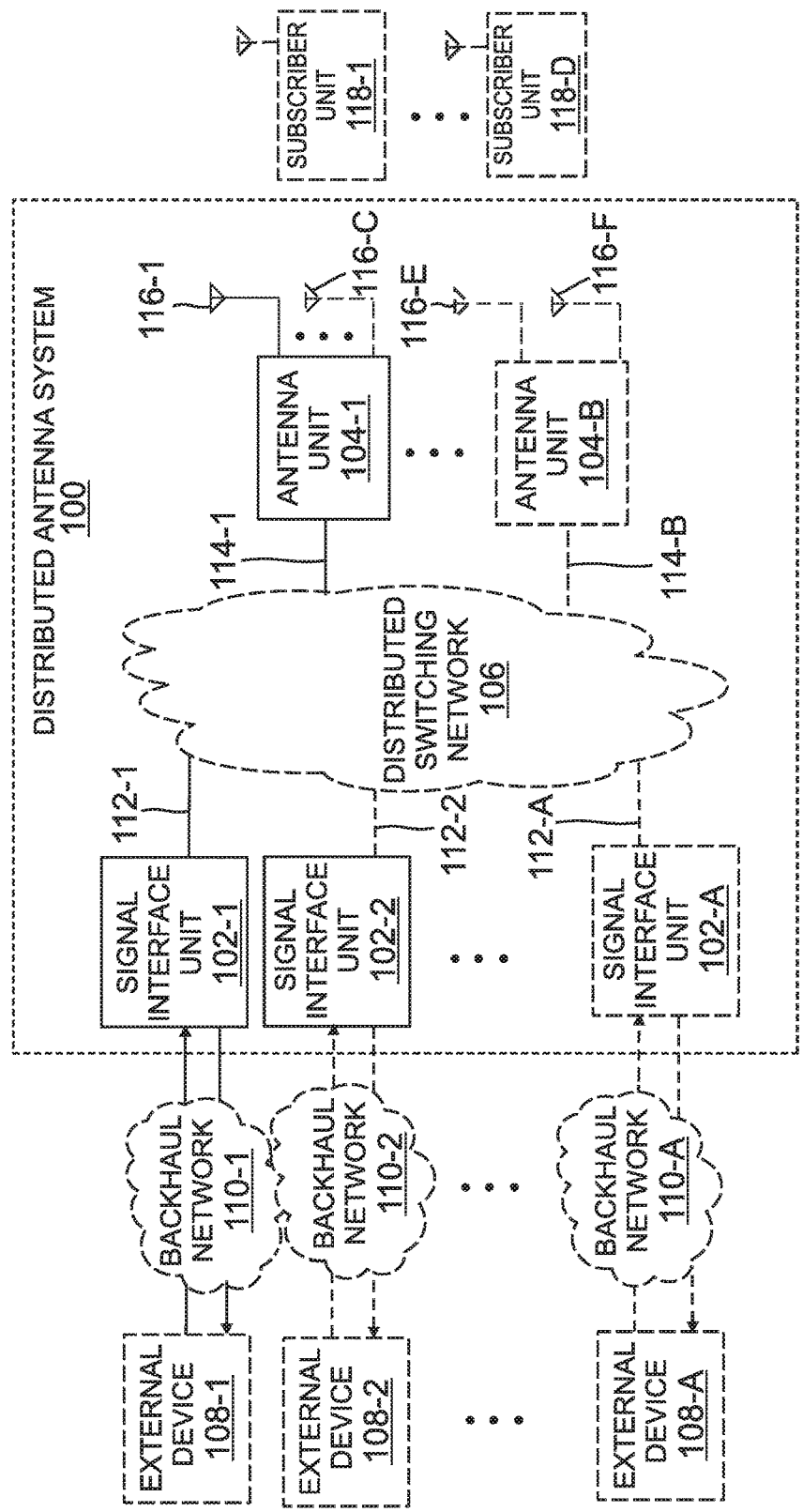
FIG. 1 is a block diagram of an exemplary embodiment of a distributed antenna system.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Some embodiments described below describe a distributed antenna system and components within the distributed antenna system including at least one signal interface unit communicatively coupled to at least one antenna unit through a distributed switching network. In other embodiments, the signal interface unit is directly coupled with the antenna unit or is included with the antenna unit in a single device. The signal interface unit is communicatively coupled to at least one external device, such as a base station, through a backhaul network. In exemplary embodiments, the signal interface unit is at least one of a Common Public Radio Interface (CPRI) base station interface, an Open Base Station Architecture Initiative (OBSAI) base station interface, and an Open Radio Interface (ORI) base station interface. The signal interface acts as a clock conversion unit to convert the clock of downlink asynchronous radio carrier signals to a common clock of the signal interface and/or the distributed antenna system. In exemplary embodiments, the downlink asynchronous radio carrier signal is a digital signal sampled at a particular rate. In exemplary embodiments, the signal interface unit includes at least one resampling filter that re-clocks the plurality of downlink asynchronous radio carrier signals to the master clock of the signal interface unit and/or distributed antenna system 100 from each different clock of each of the plurality of downlink asynchronous radio carrier signals. In exemplary embodiments, the signal interface uses interpolation to create a new signal having the common clock. In exemplary embodiments, the signal interface converts the downlink asynchronous radio carrier signals from a first clock domain of the channelized radio carrier base station interface to a second clock domain of the signal interface unit and/or the distributed antenna system using a Farrow structure. In exemplary embodiments, the signal interface is configured to re-clock the plurality of downlink asynchronous radio carrier signals by converting first sampling rates of the plurality of channelized radio carrier signals to second sampling rates.

Other embodiments described below describe an antenna unit configured to receive a plurality of downlink asynchronous digitized radio carrier signals. In exemplary embodiments, the plurality of downlink asynchronous radio carrier signals are in a digital signal sampled at a particular rate. The antenna unit includes at least one clock conversion unit for the plurality of downlink asynchronous radio carrier signals. The at least one clock conversion unit converts the clock of the downlink asynchronous radio carrier signals to a common clock of the antenna unit. In exemplary embodiments, the at least one clock conversion unit includes at least one resampling filter that re-clocks the plurality of downlink asynchronous radio carrier signals to the master clock of the remote antenna unit from each different clock of each of the plurality of downlink asynchronous radio carrier signals. In exemplary embodiments, the at least one clock conversion unit uses interpolation to create a new signal having the common clock. In exemplary embodiments, the at least one clock conversion unit converts the downlink asynchronous radio carrier signals from a first clock domain of the channelized radio carrier base station interface to a second clock domain of the remote antenna unit using a Farrow structure. In exemplary embodiments, the at least one clock conversion unit is configured to re-clock the plurality of downlink asynchronous radio carrier signals by converting first sampling rates of the plurality of channelized radio carrier signals to second sampling rates.

In exemplary embodiments, the antenna unit is multi-standard and capable of receiving at least one signal and converting it to radio frequency (RF) and transmitting it using at least one antenna. In exemplary embodiments, the antenna unit is not specific to a number of channels or an air protocol and does not necessarily require any hardware change when channels are added or removed, or a new modulation type or air protocol is used. In exemplary embodiments, a plurality of signal interface units convert a plurality of external device signals received from a plurality of external devices and representing individual channels into a single radio system signal that is transported through the distributed switching network to at least one antenna unit that converts the single radio system signal into radio frequency (RF) signals and transmits them using at least one antenna. In exemplary embodiments, the at least one antenna unit includes a single digital to analog converter and a single RF converter that can up-convert the entire radio system signal into RF spectrum having various channels.

In exemplary embodiments, the external device signals are channelized signals. As described herein, channelized signals are specific to a particular channel. In exemplary embodiments, the channelized signals are baseband data, such as channelized in-phase (I) and quadrature (Q) data in I/Q pairs. The channelized signals are not positioned relative to one another and require additional baseband conversion before RF conversion and transmission can be performed. Specifically, if a system communicated the channelized signals to an antenna unit, additional processing would be required at the antenna unit to convert the channelized signals before RF conversion and transmission.

In contrast, radio system signals are not specific to a particular channel and may include a number of different channels. The radio system signals represent either digitized or analog spectrum and are one step closer to RF signals than the channelized signals. In exemplary embodiments, the radio system signal is at an intermediate frequency that maps to a large portion of RF spectrum including a number of channels. In exemplary embodiments, the radio system signals can simply be up-converted from the intermediate frequency to radio frequency and transmitted at an antenna unit as described below. Thus, the antenna units do not need the capability of processing channelized signals before RF conversion and transmission. Accordingly, in these exemplary embodiments it doesn't matter what channels are sent to the antenna units. In exemplary embodiments, the antenna unit communicates with subscriber units using a first set of channels at first frequencies and a second set of channels at second frequencies. In exemplary embodiments, the antenna unit communicates using different modulation and/or radio access technologies simultaneously.

FIG. 1 is a block diagram of an exemplary embodiment of a distributed antenna system 100. Distributed antenna system 100 includes at least one signal interface unit 102 (including signal interface unit 102-1, optional signal interface unit 102-2, and any amount of optional signal interface units 102 through optional signal interface unit 102-A), at least one antenna unit 104 (including antenna unit 104-1 and any amount of optional antenna units 104 through optional antenna unit 104-B), and an optional distributed switching network 106.

Each signal interface unit 102 is communicatively coupled to a corresponding external device 108 directly or through a corresponding optional backhaul network 110. Each external device 108 is configured to provide signals to be transported through the distributed antenna system 100 to each corresponding signal interface unit 102. In the forward path, each signal interface unit 102 is configured to receive signals from at least one external device 108. Specifically, signal interface unit 102-1 is communicatively coupled to external device 108-1 through backhaul network 110-1, optional signal interface unit 102-2 is communicatively coupled to optional external device 108-2 through optional backhaul network 110-1, and optional signal interface unit 102-A is communicatively coupled to optional external device 108-A through optional backhaul network 110-1. In exemplary embodiments, the optional backhaul networks 110 include one or more intermediary devices positioned between the signal interface unit 102 and its corresponding external device 108.

Each signal interface unit 102 is also communicatively coupled to the distributed switching network 106 across a communication link 112. Specifically, signal interface unit 102-1 is communicatively coupled to the distributed switching network 106 across communication link 112-1, optional signal interface unit 102-2 is communicatively coupled to the distributed switching network 106 across communication link 112-2, and optional signal interface unit 102-A is communicatively coupled to the distributed switching network 106 across communication link 112-A. As described in more detail below, each signal interface unit 102 is configured to convert signals from the external device 108 to which it is communicatively coupled into a downlink radio system signal and further configured to communicate the downlink radio system signal to the distributed switching network 106 (either directly or through other components of the distributed antenna system 100) across a respective communication link 112.

In exemplary embodiments, each signal interface unit 102 includes a clock conversion unit or functionality to convert the clock of a downlink asynchronous radio carrier signal received from an external device 108 to a common clock of a signal interface unit 102 and/or the distributed antenna system 100. In exemplary embodiments, the downlink asynchronous radio carrier signal is a digital signal sampled at a particular rate. In exemplary embodiments, each signal interface unit 102 includes at least one resampling filter that re-clocks the plurality of downlink asynchronous radio carrier signals received from an external device 108 to the master clock of the signal interface unit 102 and/or distributed antenna system 100 from each different clock of each of the plurality of downlink asynchronous radio carrier signals received from each external device 108. In exemplary embodiments, each signal interface unit 102 uses interpolation to create a new signal having the common clock. In exemplary embodiments, each signal interface unit 102 converts the downlink asynchronous radio carrier signals from a first clock domain of the external device 108 to a second clock domain of the signal interface unit 102 and/or the distributed antenna system 100 using a Farrow structure. In exemplary embodiments, the signal interface is configured to re-clock the plurality of downlink asynchronous radio carrier signals by converting first sampling rates of the plurality of channelized radio carrier signals to second sampling rates. In exemplary embodiments, the external device interface is one of a Common Public Radio Interface (CPRI) external device interface, an Open Base Station Architecture Initiative (OBSAI) external device interface, and an Open Radio Interface (ORI) external device interface.

Similarly in the reverse path, in exemplary embodiments each signal interface unit 102 is configured to receive uplink radio system signals across a respective communication link 112 from distributed switching network 106. Each signal interface unit 102 is further configured to convert the received uplink radio system signal to signals formatted for the associated external device 108 and further configured to communicate the signals formatted for the associated external device 108 to the associated external device 108 directly or across the optional backhaul network 110.

In exemplary embodiments, the downlink radio system signals and the uplink radio system signals are I/Q data transported using various protocols. In exemplary embodiments, the I/Q data is transported using one of a Common Public Radio Interface (CPRI) protocol, an Open Base Station Architecture Initiative (OBSAI) protocol, and an Open Radio Interface (ORI) protocol. In exemplary embodiments, the I/Q data is transported using a wideband (multichannel) radio transport protocol, such as the Serialized RF (SeRF) protocol used by ADC Telecommunications, Inc. (part of TE Connectivity Ltd.) Shakopee, Minn. The SeRF protocol is also described in U.S. patent application Ser. No. 11/627,251, assigned to ADC Telecommunications, Inc., published in U.S. Patent Application Publication No. 2008/01101282, and incorporated herein by reference. In exemplary embodiments, the I/Q data is transported using bit transport protocols, such as Synchronous Optical Networking (SONET), Ethernet (including Synchronous Ethernet), etc. The resampling filters could be used to overcome the asynchronous nature of these bit transport protocols that are not phase locked throughout by resampling I/Q data transported using them once it arrives at a signal interface unit or antenna unit such that it becomes phase locked to the signal interface unit, distributed antenna system, or antenna unit's clock.

In exemplary embodiments, each signal interface unit 102 includes a clock conversion unit or functionality to convert the common clock of the uplink radio system signal of the distributed antenna system 100 to an uplink asynchronous radio carrier signal having a different clock for communication to an external device 108. In exemplary embodiments, the uplink asynchronous radio carrier signal is a digital signal sampled at a particular rate. In exemplary embodiments, each signal interface unit 102 includes at least one resampling filter that re-clocks the uplink radio system signal from the master clock of the signal interface unit 102 and/or distributed antenna system 100 to the different clock of the associated uplink asynchronous radio carrier signal expected by the external device 108. In exemplary embodiments, each signal interface unit 102 uses interpolation to create a new signal from the signal having the common clock. In exemplary embodiments, each signal interface unit 102 converts the uplink radio system signal from the second clock domain of the signal interface unit 102 and/or distributed antenna system 100 to the first clock domain of the external device 108 using a Farrow structure. In exemplary embodiments, each signal interface unit 102 is configured to re-clock the uplink radio system signal by converting the second sampling rate of the uplink radio system signal to a first sampling rate of the external device 108. In exemplary embodiments, the external device interface is one of a Common Public Radio Interface (CPRI) external device interface, an Open Base Station Architecture Initiative (OBSAI) external device interface, and an Open Radio Interface (ORI) external device interface.

In exemplary embodiments, optional distributed switching network 106 couples the plurality of signal interface units 102 with the at least one antenna unit 104. In other embodiments, the at least one antenna unit 104 is directly coupled to the at least one signal interface unit 102-1. Distributed switching network 106 may include one or more distributed antenna switches or other components that functionally distribute downlink radio system signals from the signal interface units 102 to the at least one antenna unit 104. Distributed switching network 106 also functionally distributes uplink signals from the at least one antenna unit 104 to the signal interface units 102. In exemplary embodiments, the distributed switching network 106 can be controlled by a separate controller or another component of the system. In exemplary embodiments the switching elements of the distributed switching network 106 are controlled either manually or automatically. In exemplary embodiments, the routes can be pre-determined and static. In other exemplary embodiments, the routes can dynamically change based on time of day, load, or other factors.

In exemplary embodiments, the downlink radio system signal is a digital signal. In exemplary embodiments, the downlink radio system signal is an analog signal that contains at least one individual channel that is positioned within a set of spectrum that reflects its eventual location within radio frequency spectrum. Said another way, the channel in each downlink radio system signal is at a different frequency than the other channels to which it may be aggregated in the distributed switching network 106. Thus, when multiple downlink radio system signals are aggregated together, the individual channels do not overlap each other and all channels can be upconverted together to radio frequency spectrum simultaneously. In exemplary embodiments, the downlink radio system signal is a digital signal through some of the distributed switching network and is converted to an analog signal at an intermediary device positioned within the distributed switching network.

Each antenna unit 104 is communicatively coupled to the distributed switching network 106 across a communication link 114. Specifically, antenna unit 104-1 is communicatively coupled to the distributed switching network 106 across communication link 114-1 and optional antenna unit 104-B is communicatively coupled to the distributed switching network 106 across communication link 114-B. In exemplary embodiments, some or all of the antenna units 104 receive a single downlink radio system signal from the distributed switching network 106 or directly from a signal interface unit 102. In exemplary embodiments, some or all of the antenna units 104 include components configured for extracting at least one downlink radio system signal from an aggregate downlink radio system signal and components configured for aggregating at least one uplink radio system signal into an aggregate uplink radio system signal as well as at least one radio frequency converter configured to convert between at least one radio system signal and at least one radio frequency band and at least one radio frequency antenna 116 configured to transmit and receive signals in the at least one radio frequency band to at least one subscriber unit 118. In exemplary embodiments, the downlink radio system signal is an aggregate of multiple downlink radio system signals each with a channel positioned within a set of spectrum that reflects its location within the RF spectrum. In exemplary embodiments having multiple downlink radio system signals aggregated together, the individual channels can be converted to the at least one radio frequency band signals simultaneously.

In the downstream, each antenna unit 104 is configured to extract at least one downlink radio system signal from the downlink aggregate radio system signal. Each antenna unit 104 is further configured to convert the at least one downlink radio system signal into a downlink radio frequency (RF) signal in a radio frequency band. In exemplary embodiments, this may include digital to analog converters and oscillators. Each antenna unit 104 is further configured to transmit the downlink radio frequency signal in the radio frequency band to at least one subscriber unit using at least one radio frequency antenna 116. In a specific exemplary embodiment, antenna unit 104-1 is configured to extract at least one downlink radio system signal from the downlink aggregate radio system signal received from the distributed switching network 106 and further configured to convert the at least one downlink radio system signal into a downlink radio frequency signal in a radio frequency band. Antenna unit 104-1 is further configured to transmit the downlink radio frequency signal in a radio frequency band using a radio frequency antenna 116-1 to at least one subscriber unit 118-1. In exemplary embodiments, antenna unit 104-1 is configured to extract a plurality of downlink radio system signals from the downlink aggregate radio system signal received from the distributed switching network 106 and configured to convert the plurality of downlink radio system signals to a plurality of downlink radio frequency signals. In exemplary embodiments with a plurality of radio frequency signals, the antenna unit 104-1 is further configured to transmit the downlink radio frequency signal in at least one radio frequency band to at least one subscriber unit 118-1 using at least radio frequency antenna 116-1. In exemplary embodiments, the antenna unit 104-1 is configured to transmit one downlink radio frequency signal to one subscriber unit 118-1 using a radio frequency antenna 116-1 and another radio frequency signal to another subscriber unit 118-D using another radio frequency antenna 116-C. In exemplary embodiments, other combinations of radio frequency antennas 116 and other components are used to communicate other combinations of radio frequency signals in other various radio frequency bands to various subscriber units 118, such as but not limited to using multiple antenna to communicate with a single subscriber unit 118.

Similarly in the reverse path, in exemplary embodiments each antenna unit 104 is configured to receive uplink radio frequency signals from at least one subscriber unit 118 using at least one radio frequency antenna 116. Each antenna unit 104 is further configured to convert the radio frequency signals to at least one uplink radio system signal. Each antenna unit 104 is further configured to aggregate the at least one uplink radio system signal into an aggregate uplink radio system signal and further configured to communicate the aggregate uplink radio system signal across at least one communication link 114 to the distributed switching network 106. In exemplary embodiments, antenna units 104 multiplex uplink signals in different bands onto the same interface for communication to the next upstream element. In other exemplary embodiments (such as example embodiments implementing diversity processing), the antenna unit 104 could aggregate (i.e. sum/combine) uplink signals in an intelligent manner. In exemplary embodiments, each uplink radio system signal contains a channel that is positioned within a set of spectrum that reflects its location within the RF spectrum. Thus and even though the uplink radio system signals that are aggregated will overlap in frequency spectrum, the individual channels themselves from the aggregated uplink radio system signals do not overlap each other when multiple uplink radio system signals are aggregated together.

In exemplary embodiments, the entire distributed antenna system 100 is phase locked using a master clock provided by at least one component within the distributed antenna system, such as a signal interface unit 102, an antenna unit 104, or another intermediary component within the distributed switching network 106 (such as a host unit for the distributed antenna system). Accordingly, once the asynchronous signals received from the external devices 108 have been re-clocked to the master clock of the distributed antenna system 100, these signals are phase locked through the distributed antenna system using the common master clock of the distributed antenna system 100.

In exemplary embodiments, a master reference clock is distributed between the various components of the distributed antenna system 100 to keep the various components locked to the same clock. While the re-clocking at the signal interface units 102 described herein enables asynchronous signals having different rates to be received at different signal interface units 102 and be converted to a common clock, in some embodiments the master reference clock to at least some of the external devices 108 are tied with the distributed antenna system 100. In exemplary embodiments, a master reference clock is provided to at least one external device 108 via at least one signal interface unit 102 so that the external device 108 can lock to the master reference clock as well. In other exemplary embodiments, the master reference clock is provided from at least one external device 108 to the distributed antenna system 100 via at least one signal interface unit 102. In exemplary embodiments, the master reference clock is generated within a component of the distributed antenna system 100, such as a signal interface unit 102, an antenna unit 104, or somewhere within the distributed switching network 106.

In exemplary embodiments, the communication links 112 and/or the communication links 114 are optical fibers and the communication across the communication links 112 and/or the communication links 114 is optical. In these embodiments, an electrical to optical conversion occurs at the antenna units 104 and/or at an intermediary device within the optional distributed switching network 106. In other embodiments, the communication links 112 and/or the communication links 114 are conductive cables (such as coaxial cable, twisted pair, etc.) and the communication across the communication links 112 and/or the communication links 114 is electrical. In exemplary embodiments, the communication across the communication links 112 and/or the communication links 114 is digital. In exemplary embodiments, the communication across the communication links 112 and/or the communication links 114 is analog. In exemplary embodiments, any mixture of optical, electrical, analog, and digital communication occurs across the communication links 112 and the communication links 114. In exemplary embodiments, an antenna unit 104 may include functionality to convert between digital and analog signals.

FIGS. 2A-2D are block diagrams of exemplary embodiments of signal interface units 102 used in distributed antenna systems, such as the exemplary distributed antenna system 100 described above. Each of FIGS. 2A-2D illustrates a different embodiment of a type of signal interface unit 102, labeled 102A-102D respectively.

Figure 2A:
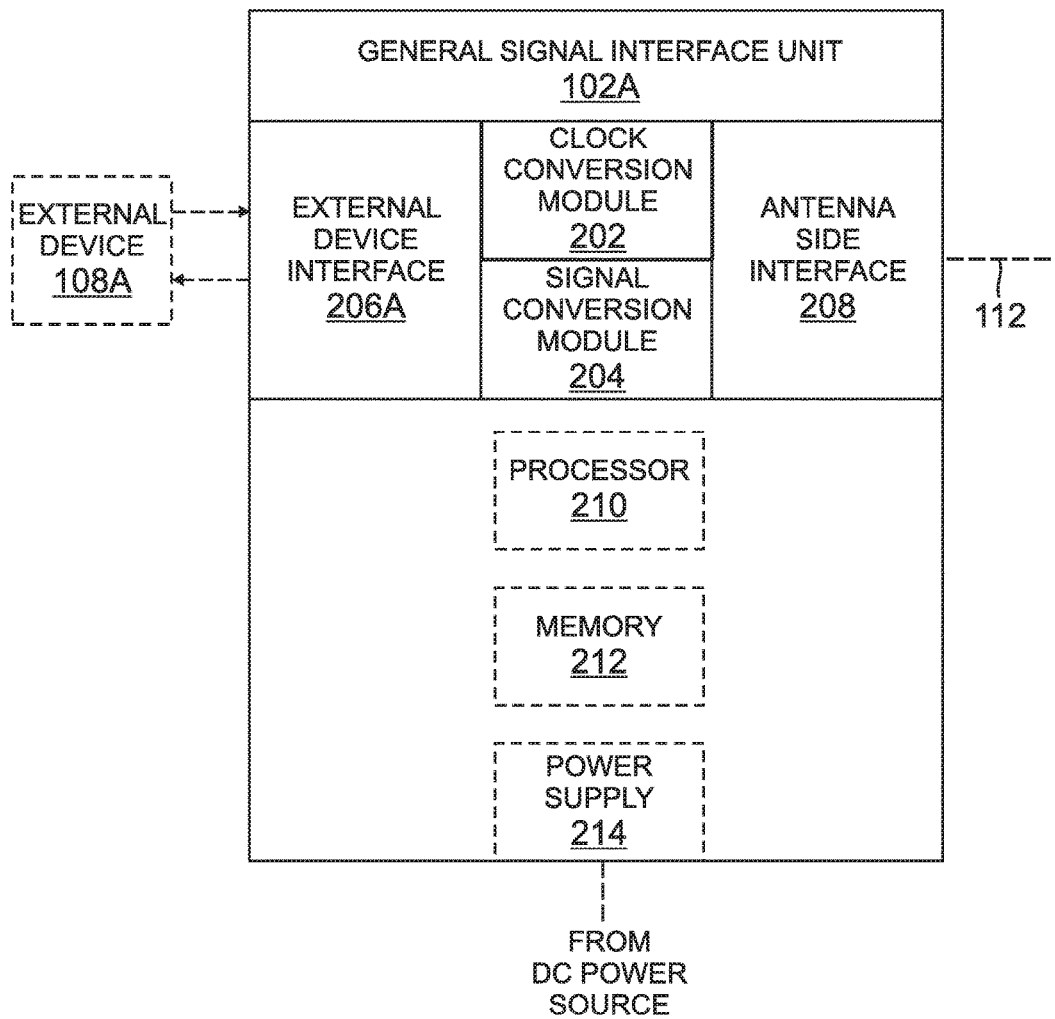
FIGS. 2A-2D are block diagrams of exemplary embodiments of signal interface units used in distributed antenna systems, such as the exemplary distributed antenna system in FIG. 1.

FIG. 2A is a block diagram of an exemplary embodiment of a signal interface unit 102, general signal interface unit 102A. General signal interface unit 102A includes clock conversion module 202, signal conversion module 204, external device interface 206A, antenna side interface 208, optional processor 210, optional memory 212, and optional power supply 214. In exemplary embodiments, signal conversion module 204 is communicatively coupled to an external device 108A through the external device interface 206A. Signal conversion module 204 is also communicatively coupled to at least one communication link 112 by antenna side interface 208. In exemplary embodiments, the communication link 112 is an optical communication link across a fiber optic cable, though it can also be other types of wired or wireless links in other embodiments. In exemplary embodiments, the signal conversion module 204 and/or portions of the external device interface 206A and/or the antenna side interface 208 are implemented using optional processor 210 and optional memory 212. In exemplary embodiments, the optional power supply 214 provides power to the various elements of the signal interface unit 102A.

In the downlink, the external device interface 206A is configured to receive downlink external device signals from the external device 108A. The clock conversion module 202 is configured to convert the clock of a downlink external device signal received from an external device 108A to a common clock of the general signal interface unit 102A and/or the distributed antenna system 100. In exemplary embodiments, the clock conversion module 202 includes at least one resampling filter that re-clocks the downlink external device signal received from the external device 108A to the master clock of the general signal interface unit 102A and/or distributed antenna system 100 from the different clock of the downlink external device signal received from the external device 108A. In exemplary embodiments, the at least one clock conversion module 202 uses interpolation to create a new signal having the common clock. In exemplary embodiments, the clock conversion module 202 converts the downlink external device signal from a first clock domain of the external device 108A to a second clock domain of the general signal interface unit 102A and/or the distributed antenna system 100 using a Farrow structure. In exemplary embodiments, the clock conversion module 202 is configured to re-clock the downlink external device signal by converting a first sampling rate of the downlink external device signal to a second sampling rate. In exemplary embodiments, the external device interface 206A is one of a Common Public Radio Interface (CPRI) external device interface, an Open Base Station Architecture Initiative (OBSAI) external device interface, and an Open Radio Interface (ORI) external device interface.

The signal conversion module 204 is configured to convert the received downlink external device signals to a downlink radio system signal. In exemplary embodiments, the signal conversion module 204 and/or the antenna side interface 208 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 208 is configured to communicate the downlink radio system signal on communication link 112.

In exemplary embodiments, the downlink radio system signal is specific to a particular channel and requires additional baseband conversion before radio frequency conversion and transmission can be performed. In exemplary embodiments, the downlink radio system signal is not specific to a particular channel and does not require additional baseband conversion before radio frequency conversion and transmission can be performed. In exemplary embodiments, the downlink radio system signal contains an individual channel that is positioned within a set of spectrum that reflects its eventual location within radio frequency spectrum. In exemplary embodiments, the downlink radio system signal interface is communicatively coupled with an intermediary device that aggregates the downlink radio system signal with at least one other downlink radio system signal before being transmitted to at least one antenna unit 104. In exemplary embodiments, the individual channels within the downlink radio system signal and the at least one other downlink radio system signal do not overlap and can be upconverted together simultaneously to radio frequency spectrum.

In the uplink, antenna side interface 208 is configured to receive an uplink radio system signal from communication link 112. In exemplary embodiments where communication link 112 is an optical medium, the antenna side interface 208 and/or the signal conversion module 204 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 204 is further configured to convert the uplink radio system signal to uplink signals.

In exemplary embodiments, the downlink radio system signals and the uplink radio system signals are I/Q data transported using various protocols. In exemplary embodiments, the I/Q data is transported using one of a Common Public Radio Interface (CPRI) protocol, an Open Base Station Architecture Initiative (OBSAI) protocol, and an Open Radio Interface (ORI) protocol. In exemplary embodiments, the I/Q data is transported using a wideband (multichannel) radio transport protocol, such as the Serialized RF (SeRF) protocol used by ADC Telecommunications, Inc. (part of TE Connectivity Ltd.) Shakopee, Minn. The SeRF protocol is also described in U.S. patent application Ser. No. 11/627,251, assigned to ADC Telecommunications, Inc., published in U.S. Patent Application Publication No. 2008/01101282, and incorporated herein by reference. In exemplary embodiments, the I/Q data is transported using bit transport protocols, such as Synchronous Optical Networking (SONET), Ethernet (including Synchronous Ethernet), etc. The resampling filters could be used to overcome the asynchronous nature of these bit transport protocols that are not phase locked throughout by resampling I/Q data transported using them once it arrives at a general signal interface unit 102A or antenna unit 104 such that it becomes phase locked to the general signal interface unit 102A, distributed antenna system 100, or antenna unit 104's clock.

In exemplary embodiments, the clock conversion module 202 converts the common clock of the uplink radio system signal of the distributed antenna system 100 to an uplink external device signal having a different clock for communication to an external device 108A. In exemplary embodiments, the clock conversion module 202 includes at least one resampling filter that re-clocks the uplink radio system signal from the master clock of the signal interface unit 102 and/or distributed antenna system 100 to the different clock of the associated uplink external device signal expected by the external device 108A. In exemplary embodiments, the clock conversion module 202 uses interpolation to create a new signal from the signal having the common clock. In exemplary embodiments, the clock conversion module 202 converts the uplink radio system signal from the second clock domain of the signal interface unit 102 and/or distributed antenna system 100 to the first clock domain of the external device 108A using a Farrow structure. In exemplary embodiments, the clock conversion module 202 is configured to re-clock the uplink radio system signal by converting the second sampling rate of the uplink radio system signal to a first sampling rate of the uplink external device signal expected by the external device 108A. External device interface 206A is configured to communicate the uplink external device signal to the external device 108A. In exemplary embodiments, the external device interface 206A is one of a Common Public Radio Interface (CPRI) external device interface, an Open Base Station Architecture Initiative (OBSAI) external device interface, and an Open Radio Interface (ORI) external device interface.

In exemplary embodiments, the uplink radio system signal contains an individual channel that is positioned within a set of spectrum that reflects its previous location within radio frequency spectrum. In exemplary embodiments, the general signal interface unit 102A is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, the uplink radio system signal is not specific to a particular channel and does not require any baseband processing when converted from radio frequency, while the uplink data may be specific to a particular channel and require baseband processing when being converted from radio frequency.

In exemplary embodiments, an optional signal interface unit clock unit is communicatively coupled to an external device clock unit of the external device 108A. In exemplary embodiments, a master reference clock is provided to the external device clock unit of the external device 108A from the signal interface unit clock unit of the signal interface unit 102A. In other exemplary embodiments, a master reference clock is provided from the external device clock unit of the external device 108A to the signal interface unit clock unit of the signal interface unit 102A. In other exemplary embodiments, a network interface clock unit is not coupled directly to an external device clock unit of the external device 108A to provide the master reference clock to the external device. Instead, a signal interface unit clock unit provides the master reference clock to the signal conversion module 204 and the master reference clock is embedded in an upstream signal from the external device interface 206A to the external device 108A. In particular, uplink signals can be clocked using the master clock, such that the master clock is embedded in the uplink signals. Then, an external device clock unit extracts the master clock from uplink signals and distributes the master clock as appropriate in the external device 108A to establish a common clock with the distributed antenna system in the external device 108A. In exemplary embodiments where the master reference clock is provided from an external device 108A to the distributed antenna system 100, the master reference clock can be embedded in the downlink external device signals by an external device clock unit so that the downlink external device signals communicated from the external device 108A to the external device interface 206A can be extracted by a signal interface unit clock unit and distributed as appropriate within the signal interface unit 102A and the distributed antenna system 100 generally.

Figure 2B:
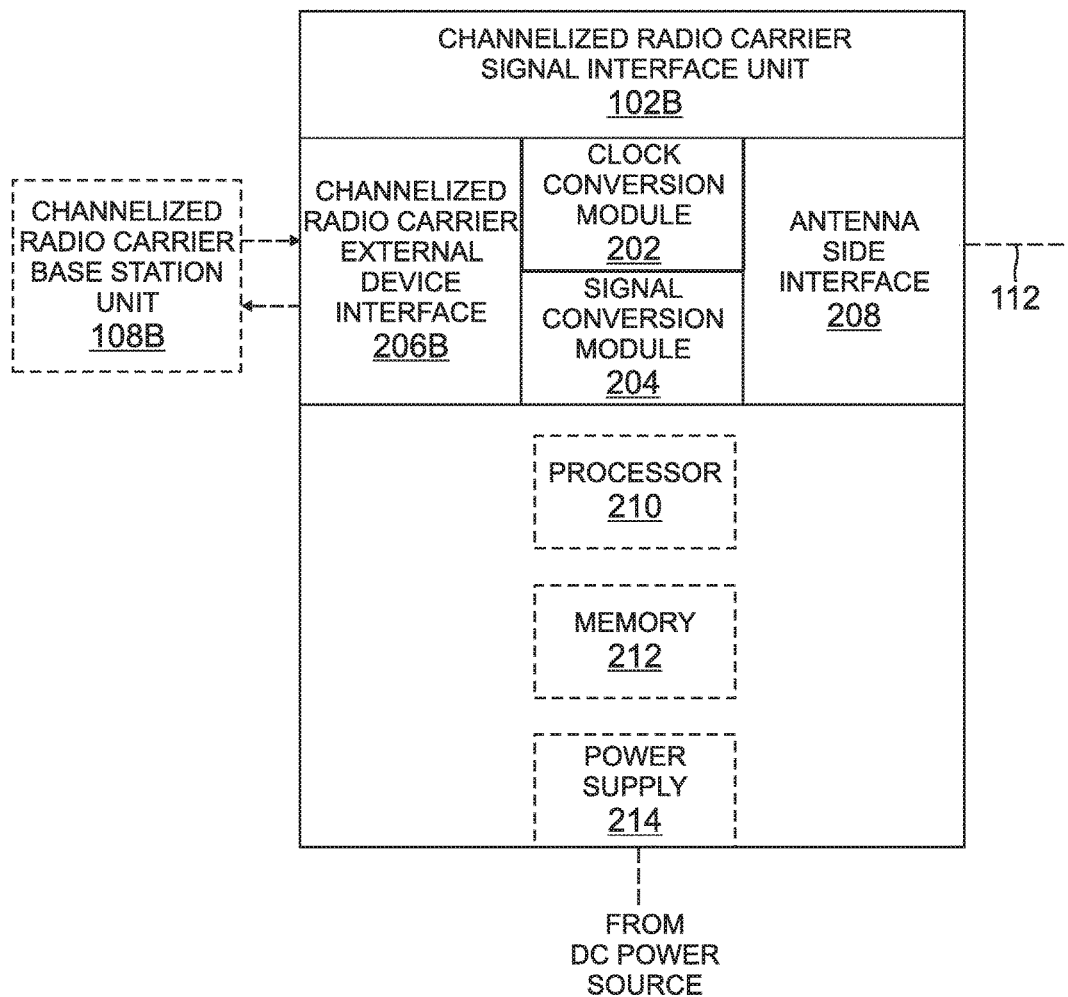

FIG. 2B is a block diagram of an exemplary embodiment of a type of signal interface unit 102, channelized radio carrier signal interface unit 102B. Channelized radio carrier signal interface unit 102B includes a clock conversion module 202, a signal conversion module 204, a channelized radio carrier external device interface 206B, the antenna side interface 208, the optional processor 210, the optional memory 212, and the optional power supply 214. Channelized radio carrier signal interface unit 102B includes similar components to general signal interface unit 102A and operates according to similar principles and methods as general signal interface unit 102A. The difference between channelized radio carrier signal interface unit 102B and general signal interface unit 102A is that the channelized radio carrier signal interface unit 102B is a more specific embodiment that interfaces with a channelized radio carrier base station unit 108B using a channelized radio carrier external device interface 206B. Further, the channelized radio carrier signal interface unit 102B includes a signal conversion module 204 that converts between channelized radio carrier signals and the radio system signals used for transport in the distributed antenna system 100.

In the downlink, the channelized radio carrier external device interface 206B is configured to receive a downlink channelized radio carrier signal from the channelized radio carrier base station unit 108B. The clock conversion module 202 is configured to convert the clock of the downlink channelized radio carrier signal received from the channelized radio carrier base station unit 108B to a common clock of the channelized radio carrier signal interface unit 102B and/or the distributed antenna system 100. In exemplary embodiments, the clock conversion module 202 includes at least one resampling filter that re-clocks the downlink channelized radio carrier signal received from the channelized radio carrier base station unit 108B to the master clock of the channelized radio carrier signal interface unit 102B and/or distributed antenna system 100 from the different clock of the downlink channelized radio carrier signal received from the channelized radio carrier base station unit 108B. In exemplary embodiments, the clock conversion module 202 converts the downlink channelized radio carrier signal from a first clock domain of the channelized radio carrier base station unit 108B to a second clock domain of the channelized radio carrier signal interface unit 102B and/or the distributed antenna system 100 using a Farrow structure. In exemplary embodiments, the clock conversion module 202 is configured to re-clock the downlink channelized radio carrier signal by converting a first sampling rate of the downlink channelized radio carrier signal to a second sampling rate. In exemplary embodiments, the channelized radio carrier signal interface unit 102B is one of a Common Public Radio Interface (CPRI) external device interface, an Open Base Station Architecture Initiative (OBSAI) external device interface, and an Open Radio Interface (ORI) external device interface.

The signal conversion module 204 is configured to convert the received downlink channelized radio carrier signals to a downlink radio system signal. In exemplary embodiments, the signal conversion module 204 and/or the antenna side interface 208 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 208 is configured to communicate the downlink radio system signal on communication link 112.

In the uplink, antenna side interface 208 is configured to receive an uplink radio system signal from communication link 112. In exemplary embodiments where communication link 112 is an optical medium, the antenna side interface 208 and/or the signal conversion module 204 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 204 is further configured to convert the uplink radio system signal to uplink channelized radio carrier signals.

In exemplary embodiments, the downlink channelized radio carrier data is specific to a particular channel and requires additional channelized radio carrier conversion before radio frequency conversion and transmission can be performed. In exemplary embodiments, the downlink radio system signals and the uplink radio system signals are I/Q data transported using various protocols. In exemplary embodiments, the I/Q data is transported using one of a Common Public Radio Interface (CPRI) protocol, an Open Base Station Architecture Initiative (OBSAI) protocol, and an Open Radio Interface (ORI) protocol. In exemplary embodiments, the I/Q data is transported using a wideband (multichannel) radio transport protocol, such as the Serialized RF (SeRF) protocol used by ADC Telecommunications, Inc. (part of TE Connectivity Ltd.) Shakopee, Minn. The SeRF protocol is also described in U.S. patent application Ser. No. 11/627,251, assigned to ADC Telecommunications, Inc., published in U.S. Patent Application Publication No. 2008/01101282, and incorporated herein by reference. In exemplary embodiments, the I/Q data is transported using bit transport protocols, such as Synchronous Optical Networking (SONET), Ethernet (including Synchronous Ethernet), etc. The resampling filters could be used to overcome the asynchronous nature of these bit transport protocols that are not phase locked throughout by resampling I/Q data transported using them once it arrives at a channelized radio carrier signal interface unit 102B or antenna unit 104 such that it becomes phase locked to the channelized radio carrier signal interface unit 102B, distributed antenna system 100, or antenna unit 104's clock.

In exemplary embodiments, the clock conversion module 202 converts the common clock of the uplink radio system signal of the distributed antenna system 100 to an uplink channelized radio carrier base station unit signal having a different clock for communication to the channelized radio carrier base station unit 108B. In exemplary embodiments, the clock conversion module 202 includes at least one resampling filter that re-clocks the uplink radio system signal from the master clock of the channelized radio carrier signal interface unit 102B and/or distributed antenna system 100 to the different clock of the associated uplink channelized radio carrier base station unit signal expected by the channelized radio carrier base station unit 108B. In exemplary embodiments, the clock conversion module 202 uses interpolation to create a new signal from the signal having the common clock. In exemplary embodiments, the clock conversion module 202 converts the uplink radio system signal from the second clock domain of the channelized radio carrier signal interface unit 102B and/or distributed antenna system 100 to the first clock domain of the channelized radio carrier base station unit 108B using a Farrow structure. In exemplary embodiments, the clock conversion module 202 is configured to re-clock the uplink radio system signal by converting the second sampling rate of the uplink radio system signal to a first sampling rate of the uplink channelized radio carrier base station unit signal expected by the channelized radio carrier base station unit 108B. Channelized radio carrier external device interface 206B is configured to communicate the uplink channelized radio carrier base station unit signal to the channelized radio carrier base station unit 108B. In exemplary embodiments, the channelized radio carrier external device interface 206B is one of a Common Public Radio Interface (CPRI) external device interface, an Open Base Station Architecture Initiative (OBSAI) external device interface, and an Open Radio Interface (ORI) external device interface. Channelized radio carrier external device interface 206B is configured to communicate the uplink channelized radio carrier signals to the channelized radio carrier base station unit 108B.

In exemplary embodiments, the uplink radio system signal contains an individual channel that is positioned within a set of spectrum that reflects its eventual location within radio frequency spectrum. In exemplary embodiments, the channelized radio carrier signal interface unit 102B is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, uplink channelized data is specific to a particular channel and requires channelized radio carrier processing when being converted from radio frequency.

In exemplary embodiments, an optional network interface clock unit is communicatively coupled to an external device clock unit of the channelized radio carrier base station unit 108B and a master reference clock is provided as described above with reference to FIG. 2A.

Figure 2C:
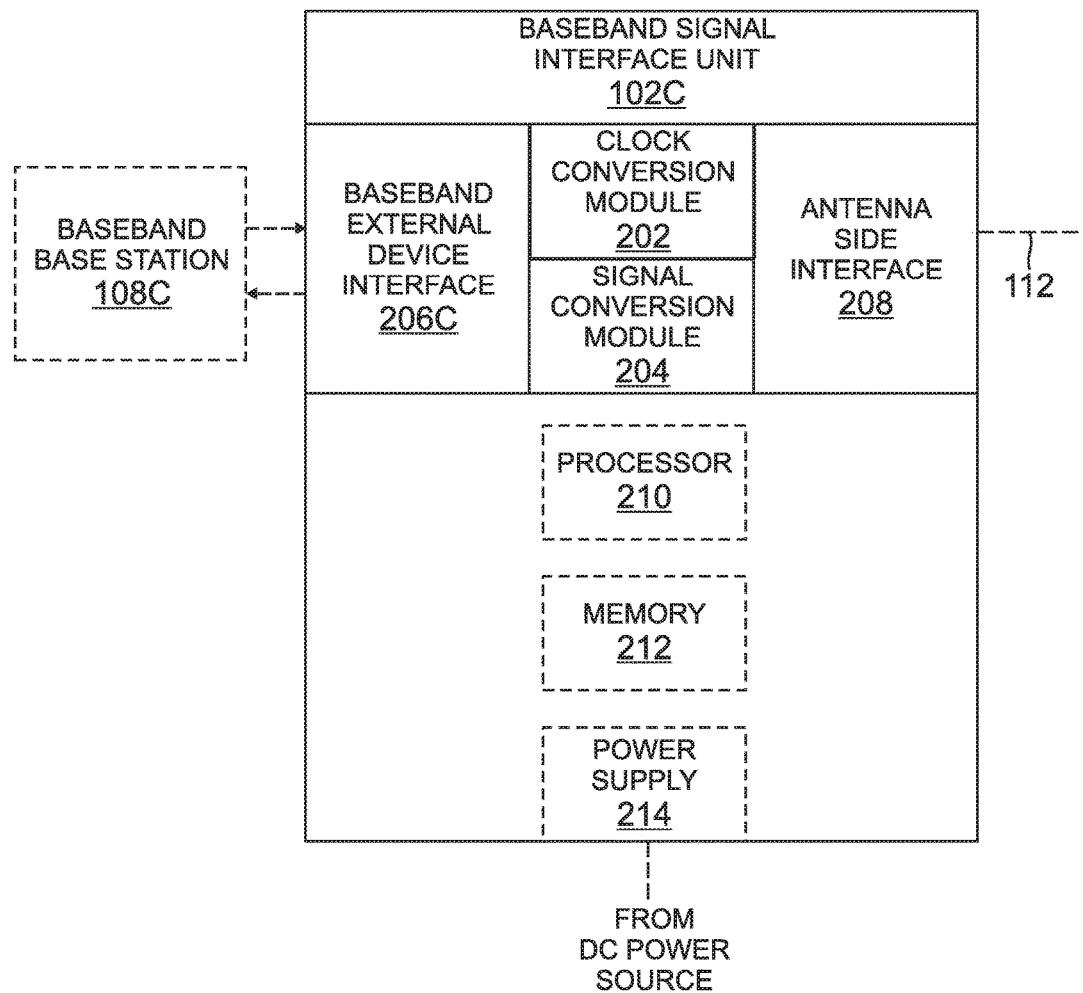

FIG. 2C is a block diagram of an exemplary embodiment of a type of signal interface unit 102, baseband signal interface unit 102C. Baseband signal interface unit 102C includes a clock conversion module 202, a signal conversion module 204, a baseband external device interface 206C, the antenna side interface 208, the optional processor 210, the optional memory 212, and the optional power supply 214. Baseband signal interface unit 102C includes similar components to general signal interface unit 102A and operates according to similar principles and methods as general signal interface unit 102A. The difference between baseband signal interface unit 102C and general signal interface unit 102A is that the baseband signal interface unit 102C is a more specific embodiment that interfaces with a baseband base station 108C using a baseband external device interface 206C. Further the baseband signal interface unit 102C includes a signal conversion module 204 that converts between baseband signals and the radio system signals used for transport in the distributed antenna system 100.

In the downlink, the baseband external device interface 206C is configured to receive a downlink baseband signal from the baseband base station 108C. The clock conversion module 202 is configured to convert the clock of the downlink baseband signal received from the baseband base station 108C to a common clock of the baseband signal interface unit 102C and/or the distributed antenna system 100. In exemplary embodiments, the clock conversion module 202 includes at least one resampling filter that re-clocks the downlink baseband signal received from the baseband base station 108C to the master clock of the baseband signal interface unit 102C and/or distributed antenna system 100 from the different clock of the downlink baseband signal received from the baseband base station 108C. In exemplary embodiments, the clock conversion module 202 converts the downlink baseband signal from a first clock domain of the baseband base station 108C to a second clock domain of the baseband signal interface unit 102C and/or the distributed antenna system 100 using a Farrow structure. In exemplary embodiments, the clock conversion module 202 is configured to re-clock the downlink baseband signal by converting a first sampling rate of the downlink baseband signal to a second sampling rate. In exemplary embodiments, the baseband signal interface unit 102C is one of a Common Public Radio Interface (CPRI) external device interface, an Open Base Station Architecture Initiative (OBSAI) external device interface, and an Open Radio Interface (ORI) external device interface.

The signal conversion module 204 is configured to convert the received downlink baseband signals to a downlink radio system signal. In exemplary embodiments, the signal conversion module 204 and/or the antenna side interface 208 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 208 is configured to communicate the downlink radio system signal on communication link 112.

In the uplink, antenna side interface 208 is configured to receive an uplink radio system signal from communication link 112. In exemplary embodiments where communication link 112 is an optical medium, the antenna side interface 208 and/or the signal conversion module 204 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 204 is further configured to convert the uplink radio system signal to uplink baseband signals.

In exemplary embodiments, the downlink baseband data is specific to a particular channel and requires additional baseband conversion before radio frequency conversion and transmission can be performed. In exemplary embodiments, the downlink radio system signals and the uplink radio system signals are I/Q data transported using various protocols. In exemplary embodiments, the I/Q data is transported using one of a Common Public Radio Interface (CPRI) protocol, an Open Base Station Architecture Initiative (OBSAI) protocol, and an Open Radio Interface (ORI) protocol. In exemplary embodiments, the I/Q data is transported using a wideband (multichannel) radio transport protocol, such as the Serialized RF (SeRF) protocol used by ADC Telecommunications, Inc. (part of TE Connectivity Ltd.) Shakopee, Minn. The SeRF protocol is also described in U.S. patent application Ser. No. 11/627,251, assigned to ADC Telecommunications, Inc., published in U.S. Patent Application Publication No. 2008/01101282, and incorporated herein by reference. In exemplary embodiments, the I/Q data is transported using bit transport protocols, such as Synchronous Optical Networking (SONET), Ethernet (including Synchronous Ethernet), etc. The resampling filters could be used to overcome the asynchronous nature of these bit transport protocols that are not phase locked throughout by resampling I/Q data transported using them once it arrives at a baseband signal interface unit 102C or antenna unit 104 such that it becomes phase locked to the baseband signal interface unit 102C, distributed antenna system 100, or antenna unit 104's clock.

In exemplary embodiments, the clock conversion module 202 converts the common clock of the uplink radio system signal of the distributed antenna system 100 to an uplink baseband base station signal having a different clock for communication to the baseband base station 108C. In exemplary embodiments, the clock conversion module 202 includes at least one resampling filter that re-clocks the uplink radio system signal from the master clock of the baseband signal interface unit 102C and/or distributed antenna system 100 to the different clock of the associated uplink baseband base station signal expected by the baseband base station 108C. In exemplary embodiments, the clock conversion module 202 uses interpolation to create a new signal from the signal having the common clock. In exemplary embodiments, the clock conversion module 202 converts the uplink radio system signal from the second clock domain of the baseband signal interface unit 102C and/or distributed antenna system 100 to the first clock domain of the baseband base station 108C using a Farrow structure. In exemplary embodiments, the clock conversion module 202 is configured to re-clock the uplink radio system signal by converting the second sampling rate of the uplink radio system signal to a first sampling rate of the uplink baseband base station signal expected by the baseband base station 108C. Baseband external device interface 206C is configured to communicate the uplink baseband base station signal to the baseband base station 108C. In exemplary embodiments, the baseband external device interface 206C is one of a Common Public Radio Interface (CPRI) external device interface, an Open Base Station Architecture Initiative (OBSAI) external device interface, and an Open Radio Interface (ORI) external device interface. Baseband external device interface 206C is configured to communicate the uplink baseband signals to the baseband base station 108C.

In exemplary embodiments, the uplink radio system signal contains an individual channel that is positioned within a set of spectrum that reflects its eventual location within radio frequency spectrum. In exemplary embodiments, the baseband signal interface unit 102C is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, uplink channelized data is specific to a particular channel and requires baseband processing when being converted from radio frequency.

In exemplary embodiments, an optional network interface clock unit is communicatively coupled to an external device clock unit of the baseband base station 108C and a master reference clock is provided as described above with reference to FIG. 2A.

Figure 2D:
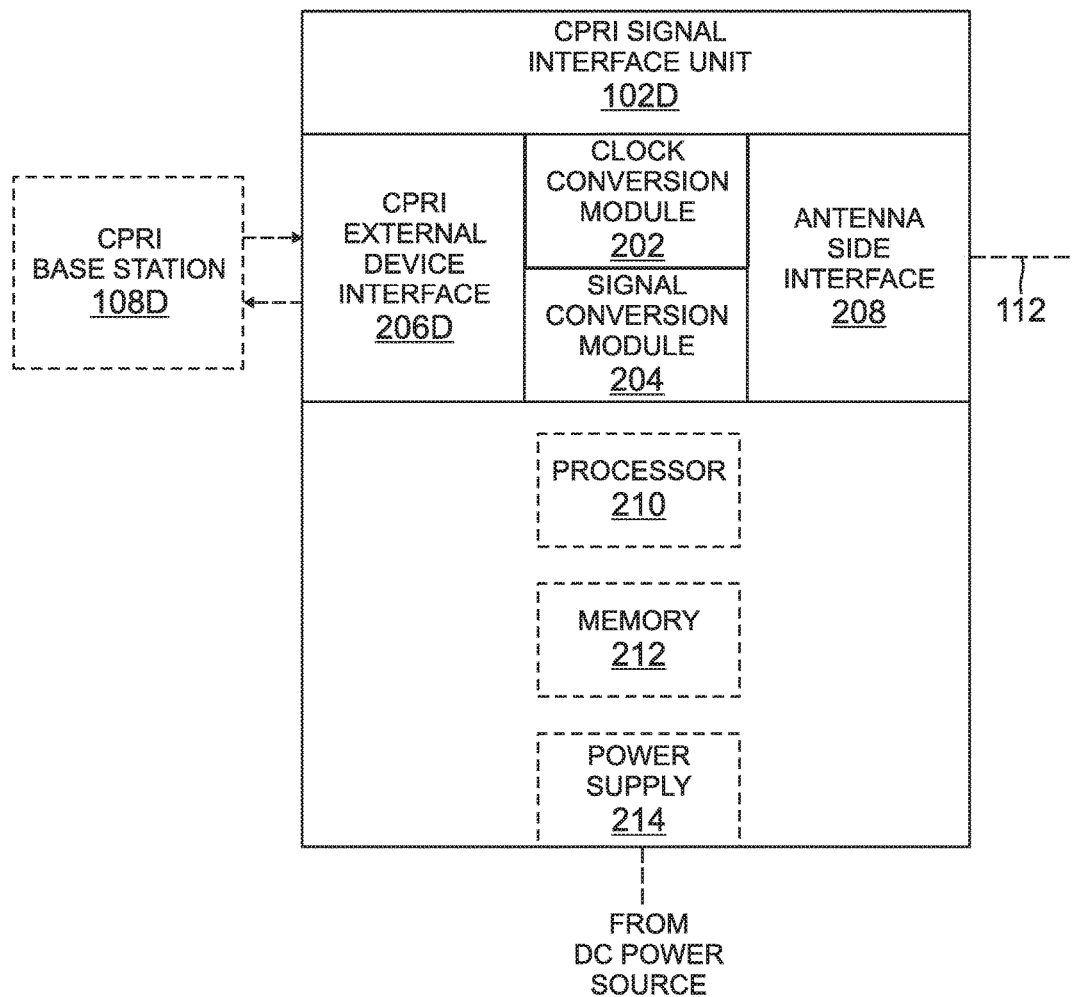

FIG. 2D is a block diagram of an exemplary embodiment of a type of signal interface unit 102, Common Public Radio Interface (CPRI) signal interface unit 102D. CPRI signal interface unit 102D includes a clock conversion module 202, a signal conversion module 204, a CPRI external device interface 206D, the antenna side interface 208, the optional processor 210, the optional memory 212, and the optional power supply 214. CPRI signal interface unit 102D includes similar components to general signal interface unit 102A and operates according to similar principles and methods as general signal interface unit 102A. The difference between CPRI signal interface unit 102D and general signal interface unit 102A is that the CPRI signal interface unit 102D is a more specific embodiment that interfaces with a CPRI base station 108D using a CPRI external device interface 206D. Further, the CPRI signal interface unit 102D includes a signal conversion module 204 that converts between CPRI signals and the radio system signals used for transport in the distributed antenna system 100.

In the downlink, the CPRI external device interface 206D is configured to receive a downlink CPRI signal from the CPRI base station 108D. The clock conversion module 202 is configured to convert the clock of the downlink CPRI signal received from the CPRI base station 108D to a common clock of the CPRI signal interface unit 102D and/or the distributed antenna system 100. In exemplary embodiments, the clock conversion module 202 includes at least one resampling filter that re-clocks the downlink CPRI signal received from the CPRI base station 108D to the master clock of the CPRI signal interface unit 102D and/or distributed antenna system 100 from the different clock of the downlink CPRI signal received from the CPRI base station 108D. In exemplary embodiments, the clock conversion module 202 uses interpolation to create a new signal having the common clock. In exemplary embodiments, the clock conversion module 202 converts the downlink CPRI signal from a first clock domain of the CPRI base station 108D to a second clock domain of the CPRI signal interface unit 102D and/or the distributed antenna system 100 using a Farrow structure. In exemplary embodiments, the clock conversion module 202 is configured to re-clock the downlink CPRI signal by converting a first sampling rate of the downlink CPRI signal to a second sampling rate.

The signal conversion module 204 is configured to convert the received downlink CPRI signals to a downlink radio system signal. In exemplary embodiments, the signal conversion module 204 and/or the antenna side interface 208 converts the radio system signal from electrical signals to optical signals for output on communication link 112. In other embodiments, the radio system signal is transported using a conductive communication medium, such as coaxial cable or twisted pair, and the optical conversion is not necessary. The antenna side interface 208 is configured to communicate the downlink radio system signal on communication link 112.

In exemplary embodiments, the downlink baseband data is specific to a particular channel and requires additional baseband conversion before radio frequency conversion and transmission can be performed. In exemplary embodiments, the downlink radio system signal is not specific to a particular channel and does not require additional baseband conversion before radio frequency conversion and transmission can be performed. In exemplary embodiments, the downlink radio system signal contains an individual channel that is positioned within a set of spectrum that reflects its eventual location within radio frequency spectrum. In exemplary embodiments, the downlink radio system signal interface is communicatively coupled with an intermediary device that aggregates the downlink radio system signal with at least one other downlink radio system signal before being transmitted to at least one antenna unit 104. In exemplary embodiments, the individual channels within the downlink radio system signal and the at least one other downlink radio system signal do not overlap and can be upconverted together simultaneously to radio frequency spectrum.

In the uplink, antenna side interface 208 is configured to receive an uplink radio system signal from communication link 112. In exemplary embodiments where communication link 112 is an optical medium, the antenna side interface 208 and/or the signal conversion module 204 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 204 is further configured to convert the uplink radio system signal to uplink CPRI signals.

In exemplary embodiments, the downlink radio system signals and the uplink radio system signals are I/Q data transported using various protocols. In exemplary embodiments, the I/Q data is transported using one of a Common Public Radio Interface (CPRI) protocol, an Open Base Station Architecture Initiative (OBSAI) protocol, and an Open Radio Interface (ORI) protocol. In exemplary embodiments, the I/Q data is transported using a wideband (multichannel) radio transport protocol, such as the Serialized RF (SeRF) protocol used by ADC Telecommunications, Inc. (part of TE Connectivity Ltd.) Shakopee, Minn. The SeRF protocol is also described in U.S. patent application Ser. No. 11/627,251, assigned to ADC Telecommunications, Inc., published in U.S. Patent Application Publication No. 2008/01101282, and incorporated herein by reference. In exemplary embodiments, the I/Q data is transported using bit transport protocols, such as Synchronous Optical Networking (SONET), Ethernet (including Synchronous Ethernet), etc. The resampling filters could be used to overcome the asynchronous nature of these bit transport protocols that are not phase locked throughout by resampling I/Q data transported using them once it arrives at a CPRI signal interface unit 102D or antenna unit 104 such that it becomes phase locked to the CPRI signal interface unit 102D, distributed antenna system 100, or antenna unit 104's clock.

In exemplary embodiments, the clock conversion module 202 converts the common clock of the uplink radio system signal of the distributed antenna system 100 to an uplink CPRI base station signal having a different clock for communication to the CPRI base station 108D. In exemplary embodiments, the clock conversion module 202 includes at least one resampling filter that re-clocks the uplink radio system signal from the master clock of the CPRI signal interface unit 102D and/or distributed antenna system 100 to the different clock of the associated uplink CPRI base station signal expected by the CPRI base station 108D. In exemplary embodiments, the clock conversion module 202 uses interpolation to create a new signal from the signal having the common clock. In exemplary embodiments, the clock conversion module 202 converts the uplink radio system signal from the second clock domain of the CPRI signal interface unit 102D and/or distributed antenna system 100 to the first clock domain of the CPRI base station 108D using a Farrow structure. In exemplary embodiments, the clock conversion module 202 is configured to re-clock the uplink radio system signal by converting the second sampling rate of the uplink radio system signal to a first sampling rate of the uplink CPRI base station signal expected by the CPRI base station 108D. CPRI external device interface 206D is configured to communicate the uplink CPRI base station signal to the CPRI base station 108D. CPRI external device interface 206D is configured to communicate the uplink CPRI signals to the CPRI base station 108D.

In exemplary embodiments, the uplink radio system signal contains an individual channel that is positioned within a set of spectrum that reflects its eventual location within radio frequency spectrum. In exemplary embodiments, the CPRI signal interface unit 102D is communicatively coupled with an intermediary device that separates the uplink radio system signal from an aggregate uplink radio system signal received from at least one antenna unit 104 and including at least one other uplink radio system signal. In exemplary implementations, the individual channels within the uplink radio system signal and the at least one other uplink radio system signal do not overlap and can be downconverted together simultaneously from radio frequency spectrum. In exemplary embodiments, the uplink radio system signal is not specific to a particular channel and does not require any baseband processing when converted from radio frequency, while uplink channelized data is specific to a particular channel and requires baseband processing when being converted from radio frequency.

In exemplary embodiments, an optional network interface clock unit is communicatively coupled to an external device clock unit of the CPRI base station 108D and a master reference clock is provided as described above with reference to FIG. 2A.

Figure 3:
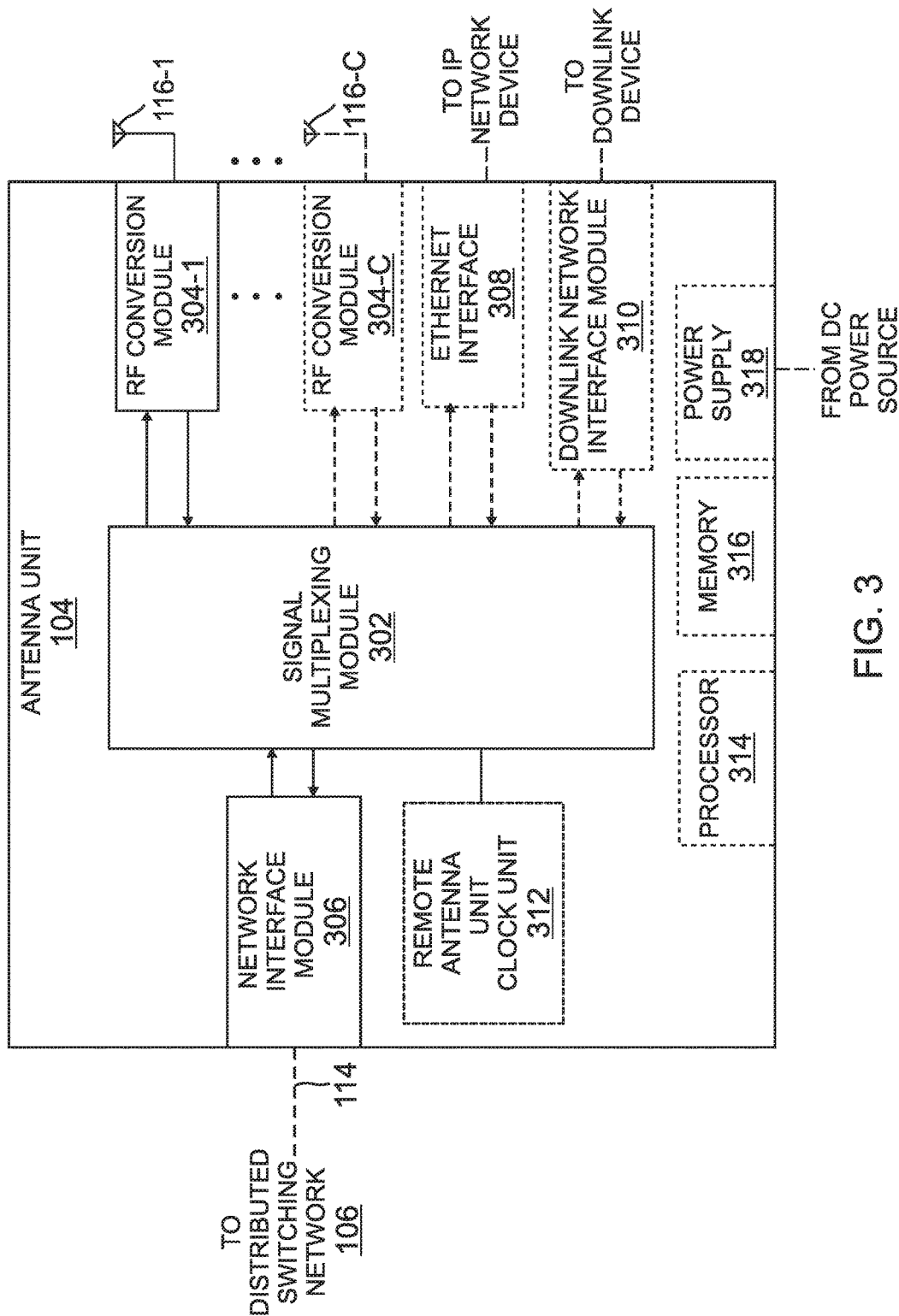
FIG. 3 is a block diagrams of exemplary embodiments of an antenna unit used in distributed antenna systems, such as the exemplary distributed antenna system in FIG. 1.

FIG. 3 is a block diagram of an exemplary embodiment of an antenna unit 104 used in distributed antenna systems, such as the exemplary distributed antenna system 100 described above. The antenna unit 104 includes a signal multiplexing module 302, at least one radio frequency (RF) conversion module 304 (including RF conversion module 304-1 and any amount of optional RF conversion modules 304 through optional RF conversion module 304-C), network interface module 306, optional Ethernet interface 308, optional downlink network interface module 310, optional antenna unit clock unit 312, optional processor 314, optional memory 316, and optional power supply 318. In exemplary embodiments, signal multiplexing module 302, at least one RF conversion module 304, and/or the network interface module 306 are implemented at least in part by optional processor 314 and optional memory 316. In exemplary embodiments, optional power supply 318 is used to power the various components of the antenna unit 104.

In exemplary embodiments, signal multiplexing module 302 receives at least one downlink radio system signal from at least one signal interface unit 102 through the distributed switching network 106. In exemplary embodiments, the at least one downlink radio system signal is received through the network interface module 306. In exemplary embodiments where the downlink radio system signal is an optical signal, the network interface module 306 converts the downlink radio system signal from an optical format to an electrical format. In exemplary embodiments, more input lines and/or more network interface module 306 are included in the antenna unit 104. In exemplary embodiments, the signal multiplexing module 302 splits apart an aggregate downlink radio system signal into at least one downlink radio system signal that is sent to RF conversion module 304-1 for eventual transmission as a radio frequency on radio frequency antenna 116-1. In exemplary embodiments, the signal multiplexing module 302 splits apart the aggregate downlink radio system signal into a plurality of downlink radio system signals that are sent to a plurality of RF conversion modules 304 for eventual transmission as radio frequency signals at radio frequency antennas 116.

In exemplary embodiments, signal multiplexing module 302 receives at least one uplink radio system signal from at least one RF conversion module 304. In exemplary embodiments, the signal multiplexing module 302 receives a plurality of uplink radio system signals from a plurality of RF conversion modules 304. In exemplary embodiments, the radio system signal multiplexing unit aggregates at least one uplink radio system signal received from an RF conversion module 304-1 with another uplink radio system signal received from another RF conversion module 304. In exemplary embodiments, the signal multiplexing module 302 aggregates a plurality of uplink radio system signals into a single aggregate uplink radio system signal. In exemplary embodiments, the aggregate uplink radio system signal is provided to network interface module 306 which converts the aggregate uplink radio system signal from electrical signals to optical signals before communicating the aggregate uplink radio system signal to the distributed switching network 106. In other embodiments, the aggregate uplink radio system signal is communicated as electrical signals to the distributed switching network 106. In exemplary embodiments, the aggregate uplink signal is converted to optical signals at another place in the distributed antenna system 100.

In exemplary embodiments, the optional Ethernet interface 308 receives a downlink radio system signal from the signal multiplexing module 302 and converts it to Ethernet packets and communicates the Ethernet packets with an internet protocol network device. The optional Ethernet interface 308 also receives Ethernet packets from the internet protocol network device and converts them to an uplink radio system signal and communicates it to the signal multiplexing module 302. In exemplary embodiments having the optional Ethernet interface 308, a corresponding external device 108 that is an Ethernet interface interfaces with a signal interface unit 102 that is an Ethernet interface.

In exemplary embodiments, the optional downlink network interface module 310 receives a downlink radio system signal from the signal multiplexing module 302 and communicates it with a downlink device across a downlink communication medium. In exemplary embodiments, the downlink device is another antenna unit 104.

In exemplary embodiments, the optional antenna unit clock unit 312 extracts the master reference clock from the downlink radio system signal and uses this master clock within the antenna unit 104 to establish a common time base in the antenna unit 104 with the rest of the distributed antenna system 100. In exemplary embodiments, the optional antenna unit clock unit 312 generates a master reference clock and distributes the generated master reference clock to other components of the distributed antenna system 100 (and even the external devices 108) in the upstream using the uplink radio system signal.

Figure 4A:
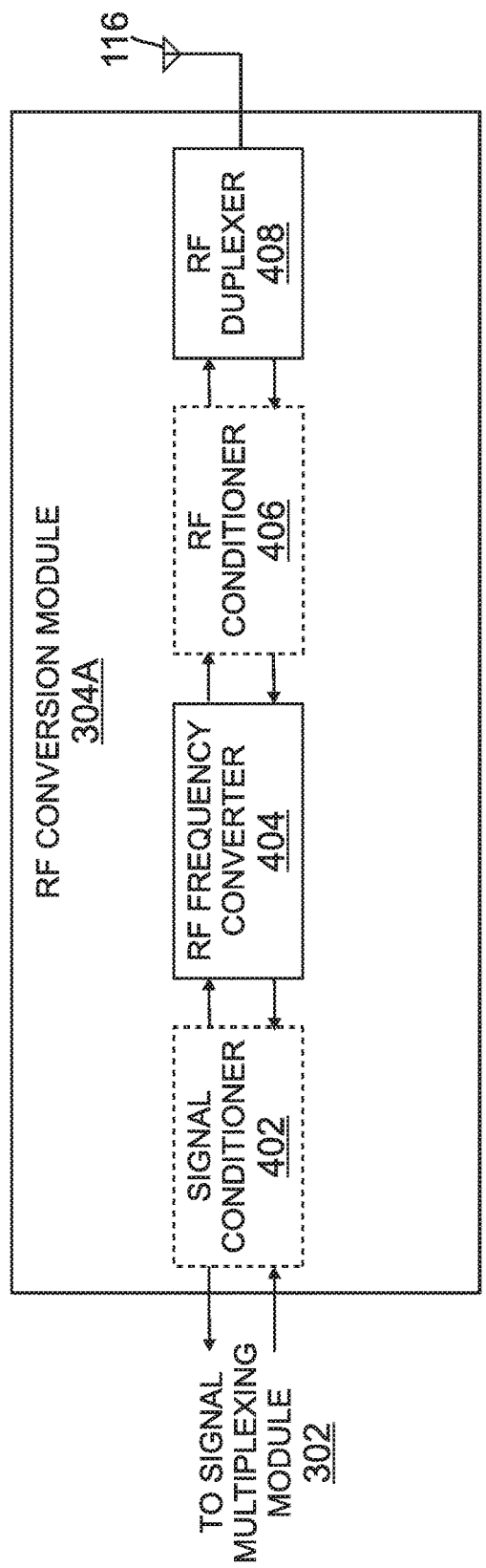
FIGS. 4A-4C are block diagrams of exemplary embodiments of RF conversion modules used in antenna units of distributed antenna systems, such as the exemplary antenna unit in FIG. 3.
Figure 4B:
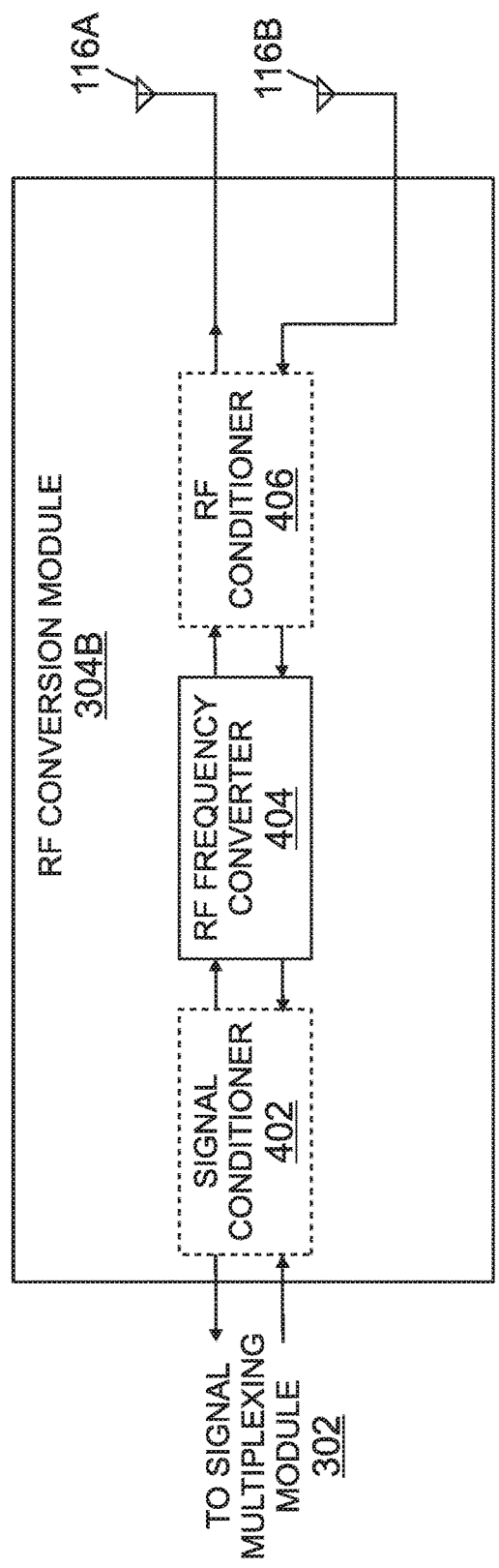
Figure 4C:
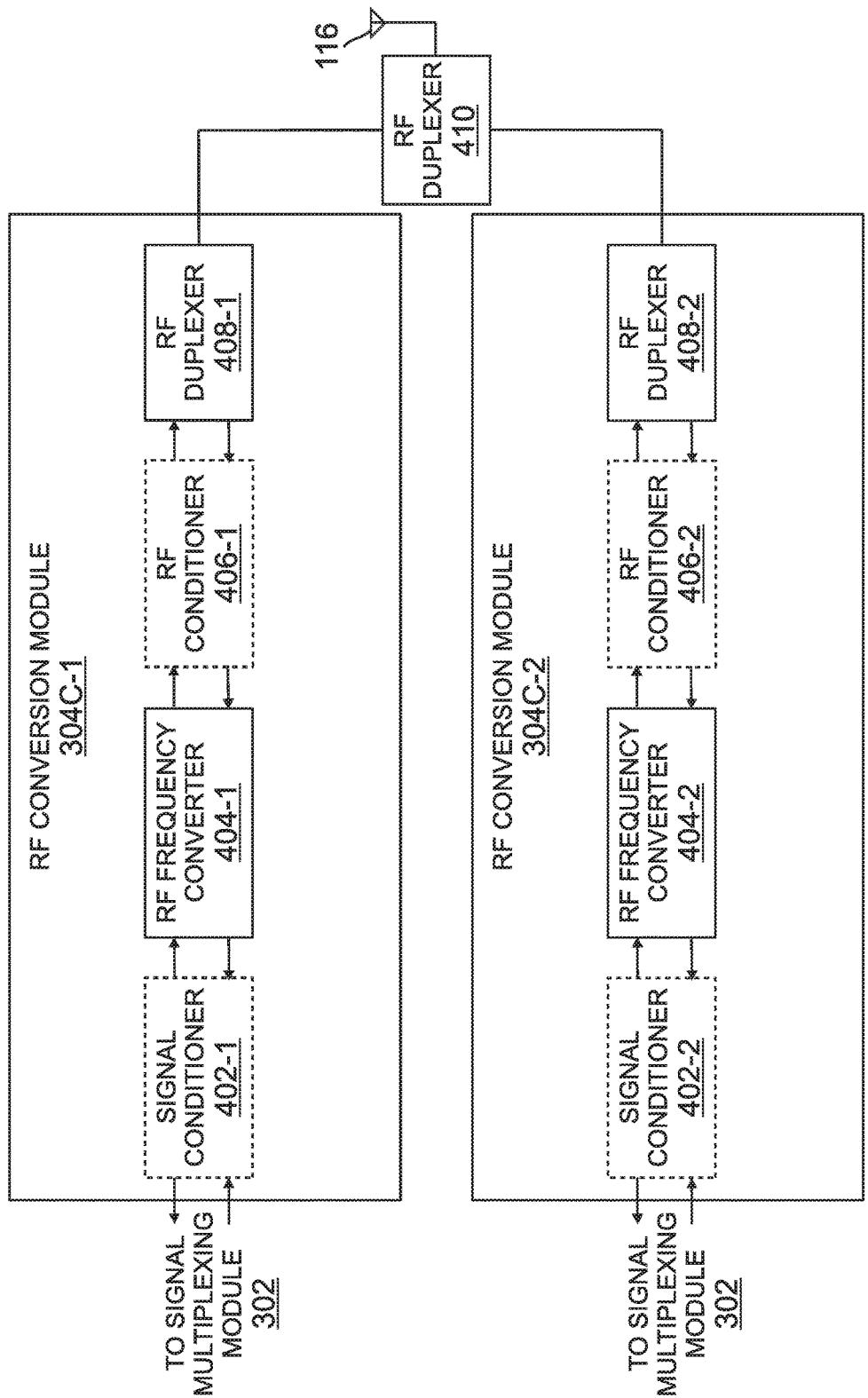

FIGS. 4A-4C are block diagrams of exemplary embodiments of RF conversion modules 304 used in antenna units of distributed antenna systems, such as the exemplary antenna unit 104 described above. Each of FIGS. 4A-4C are block diagrams of exemplary embodiments of RF conversion module 304, labeled RF conversion module 304A-304C respectively.

FIG. 4A is a block diagram of an exemplary RF conversion module 304A including an optional radio system signal conditioner 402, an RF frequency converter 404, an optional RF conditioner 406, and an RF duplexer 408 coupled to a single radio frequency antenna 116.

The optional radio system signal conditioner 402 is communicatively coupled to a signal multiplexing module 302 and the radio frequency (RF) frequency converter 404. In the forward path, the optional radio system signal conditioner 402 conditions the downlink radio system signal (for example, through amplification, attenuation, and filtering) received from the signal multiplexing module 302 and passes the downlink radio system signal to the RF frequency converter 404. In the reverse path, the optional radio system signal conditioner 402 conditions the uplink radio system signal (for example, through amplification, attenuation, and filtering) received from the RF frequency converter 404 and passes the uplink radio system signal to the signal multiplexing module 302.

The RF frequency converter 404 is communicatively coupled to either the signal multiplexing module 302 or the optional radio system signal conditioner 402 on one side and to either RF duplexer 408 or the optional RF conditioner 406 on the other side. In the downstream, the RF frequency converter 404 converts a downlink radio system signal to downlink radio frequency (RF) signals and passes the downlink RF signals onto either the RF duplexer 408 or the optional RF conditioner 406. In the upstream, the RF frequency converter 404 converts uplink radio frequency (RF) signals received from either the RF duplexer 408 or the optional RF conditioner 406 to an uplink radio system signal and passes the uplink radio system signal to either the signal multiplexing module 302 or the optional radio system signal conditioner 402.

The RF duplexer 408 is communicatively coupled to either the RF frequency converter 404 or the optional RF conditioner 406 on one side and the radio frequency antenna 116 on the other side. The RF duplexer 408 duplexes the downlink RF signals with the uplink RF signals for transmission/reception using the radio frequency antenna 116. In exemplary embodiments, the downlink and uplink signals within a radio frequency band are distinct in spectrum and are separated in a frequency using a Frequency Division Duplexing (FDD) scheme. In other embodiments, either or both of the downlink and uplink signals within the radio frequency band are separated in time using a Time Division Duplexing (TDD) scheme. In exemplary embodiments, downlink and uplink signals within a radio frequency band overlap in spectrum and are separated in time using a Time Division Duplexing (TDD) scheme.

FIG. 4B is a block diagram of an exemplary RF conversion module 304B including an optional radio system signal conditioner 402, an RF frequency converter 404, and an optional RF conditioner 406 coupled to a downlink radio frequency antenna 116A and an uplink radio frequency antenna 116B. RF conversion module 304B includes similar components to RF conversion module 304A and operates according to similar principles and methods as RF conversion module 304A described above. The difference between RF conversion module 304B and RF conversion module 304A is that RF conversion module 304B does not include RF duplexer 408 and instead includes separate downlink radio frequency antenna 116A used to transmit RF signals to at least one subscriber unit and uplink radio frequency antenna 116B used to receive RF signals from at least one subscriber unit.

FIG. 4C is a block diagram of an exemplary RF conversion module 304C-1 and exemplary RF conversion module 304C-2 that share a single radio frequency antenna 116 through an RF diplexer 410. The RF conversion module 304C-1 includes an optional radio system signal conditioner 402-1, an RF frequency converter 404-1, an optional RF conditioner 406-1, and an RF duplexer 408-1 communicatively coupled to RF diplexer 410 that is communicatively coupled to radio frequency antenna 116. Similarly, the RF conversion module 304C-2 includes an optional radio system signal conditioner 402-2, an RF frequency converter 404-2, an optional RF conditioner 406-2, and an RF duplexer 408-2 communicatively coupled to RF diplexer 410 that is communicatively coupled to radio frequency antenna 116. Each of RF conversion module 304C-1 and 304C-2 operate according to similar principles and methods as RF conversion module 304A described above. The difference between RF conversion modules 304C-1 and 304C-2 and RF conversion module 304A is that RF conversion modules 304C-1 and 304C-2 are both coupled to a single radio frequency antenna 116 through RF diplexer 410. The RF diplexer 410 diplexes the duplexed downlink and uplink signals for both RF conversion module 304C-1 and 304C-2 for transmission/reception using the single radio frequency antenna 116.

Figure 5A:
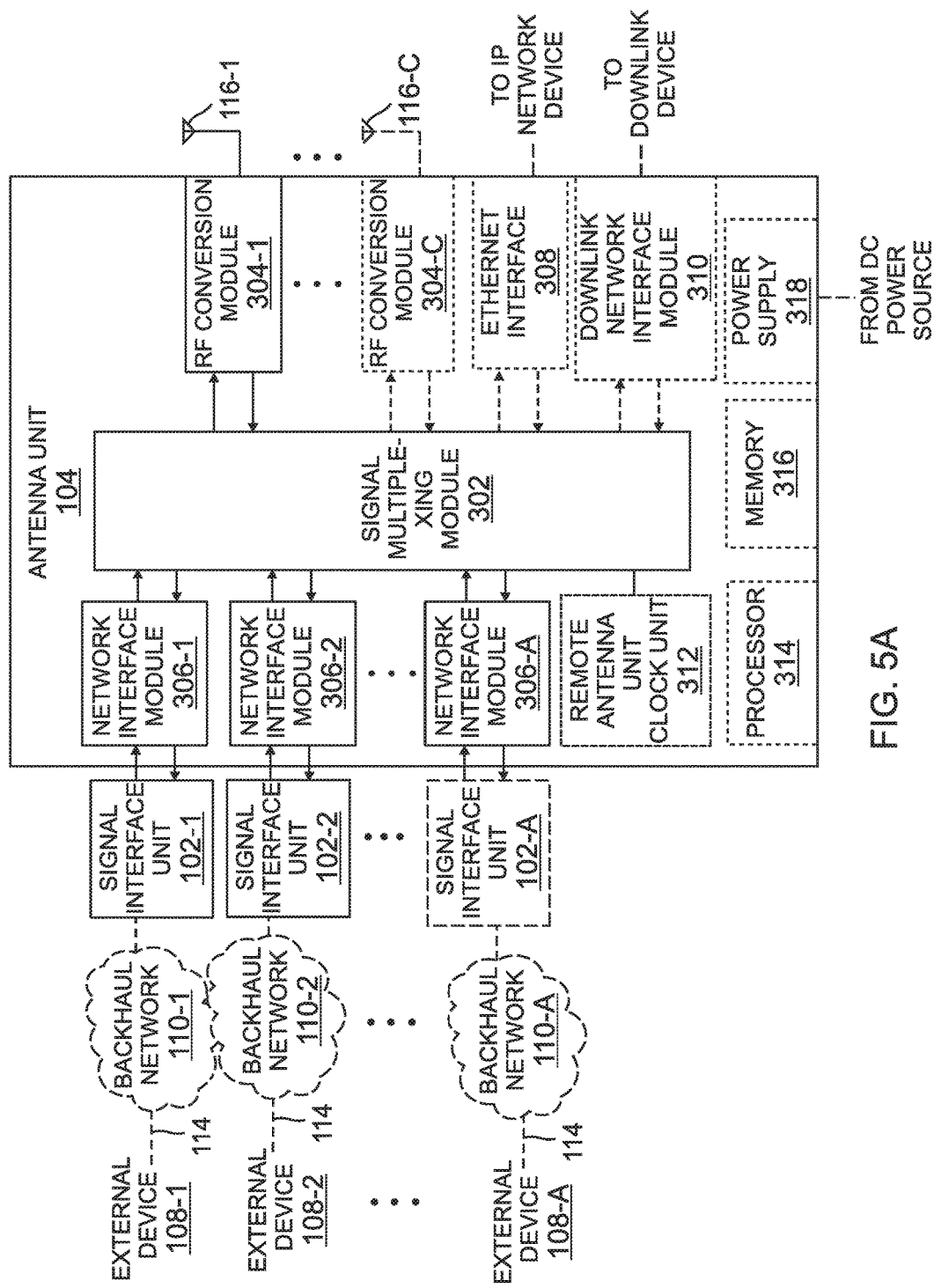
FIGS. 5A-5B are block diagrams of an exemplary embodiment of an antenna unit used in distributed antenna systems, such as the exemplary distributed antenna systems in FIG. 1.
Figure 5B:
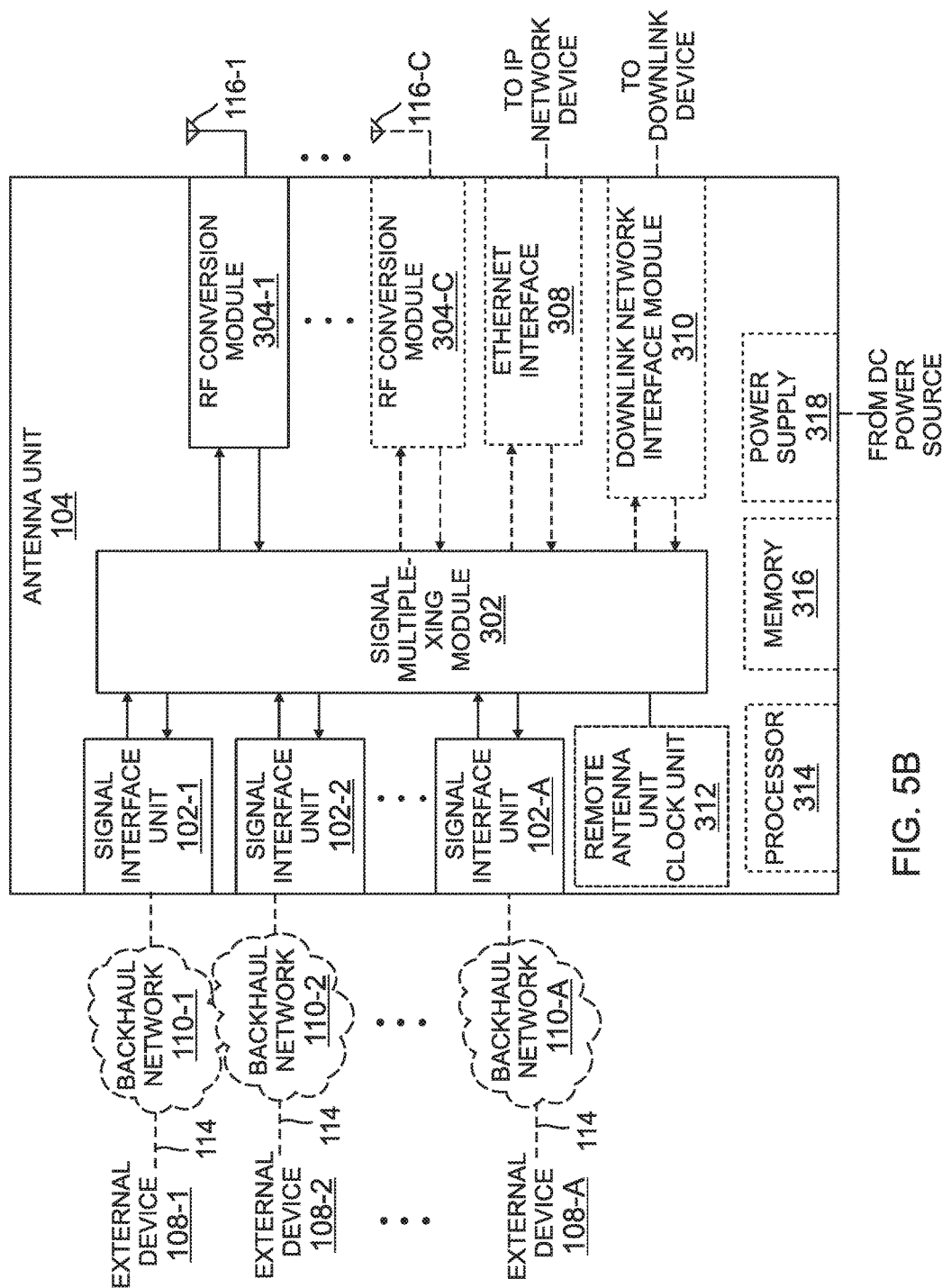

FIGS. 5A-5B are block diagrams of an exemplary embodiment of an antenna unit 104 used in distributed antenna systems, such as the exemplary distributed antenna system 100 described above. Each of FIGS. 5A-5B are block diagrams of exemplary embodiments of antenna unit 104, labeled antenna unit 104A-104B respectively.

FIG. 5A is a block diagram of an exemplary embodiment of an antenna unit 104A used without a distributed antenna system. Antenna unit 104A includes similar components to the antenna unit 104 including a signal multiplexing module 302, at least one radio frequency (RF) conversion module 304 (including RF conversion module 304-1 and any amount of optional RF conversion modules 304 through optional RF conversion module 304-C), a plurality of network interface modules 306 (including network interface module 306-1, network interface module 306-2, and any amount of optional network interface module 306 through optional network interface module 306-A), optional Ethernet interface 308, optional downlink network interface module 310, optional antenna unit clock unit 312, optional processor 314, optional memory 316, and optional power supply 318. In exemplary embodiments, signal multiplexing module 302, at least one RF conversion module 304, and/or the network interface module 306 are implemented at least in part by optional processor 314 and optional memory 316. In exemplary embodiments, optional power supply 318 is used to power the various components of the antenna unit 104A.

Antenna unit 104A includes similar components to antenna unit 104 and operates according to similar principles and methods as antenna unit 104 described above. The difference between antenna unit 104A and antenna unit 104 is that antenna unit 104A includes a plurality of network interface modules 306 communicatively coupled to a plurality of signal interface units 102 that are each coupled either directly to an external device 108 or through an optional backhaul network 110. In exemplary embodiments, the backhaul network 110 is a baseband base station network transporting I/Q samples from a baseband base station acting as the external device 108. In exemplary embodiments, the backhaul network 110 is a CPRI base station network transporting CPRI signals from a CPRI base station acting as the external device 108. In exemplary embodiments, the backhaul network 110 is a SONET network transporting SONET frames from a SONET network interface acting as the external device 108. In exemplary embodiments, the backhaul network 110 is an Ethernet network, transporting Ethernet frames and/or Internet Protocol (IP) packets from an Ethernet network interface acting as the external device 108. In exemplary embodiments, various signal interface units 102 interface with various types of external devices 108 and couple with the single antenna unit 104B. Accordingly, the antenna unit 104A itself can interface with asynchronous external devices 108 and each signal interface unit 102 converts the clock from the various clocks of the external devices 108 to a common clock of the antenna unit 104B. The signal interface units 102 further convert the various types of signals of the external devices into the radio system signal used by the antenna unit 104A and are interfaced with the various network interface modules 306. In exemplary embodiments, the signal multiplexing module can multiplex radio system signals derived from the various external devices 108 into at least one signal communicated to one or more RF conversion modules 304.

FIG. 5B is a block diagram of an exemplary embodiment of an antenna unit 104B used without a distributed antenna system. Antenna unit 104B includes similar components to the antenna unit 104B including signal multiplexing module 302, at least one radio frequency (RF) conversion module 304 (including RF conversion module 304-1 and any amount of optional RF conversion modules 304 through optional RF conversion module 304-C), optional Ethernet interface 308, optional downlink network interface module 310, optional antenna unit clock unit 312, optional processor 314, optional memory 316, and optional power supply 318. In exemplary embodiments, signal multiplexing module 302, at least one RF conversion module 304, and/or the network interface module 306 are implemented at least in part by optional processor 314 and optional memory 316. In exemplary embodiments, optional power supply 318 is used to power the various components of the antenna unit 104A.

Antenna unit 104B includes similar components to antenna unit 104A and operates according to similar principles and methods as antenna unit 104 and antenna unit 104B described above. The difference between antenna unit 104B and antenna unit 104A is that instead of the plurality of network interface modules 306, antenna unit 104B includes a plurality of signal interface units 102 (including signal interface unit 102-1, signal interface unit 102-2, and any amount of optional signal interface units 102 through optional signal interface unit 102-A) communicatively coupled either directly to an external device 108 or through an optional backhaul network 110. Essentially, antenna unit 104B brings the signal interface unit 102 functionality into the antenna unit 104B instead of having them as stand alone units. Other than that change, it operates as described above.

In other embodiments, an antenna unit 104 may have a combination of integrated signal interface units 102, external signal interface units 102, and coupling with a distributed switching network as various inputs to the antenna unit 104 based on the various embodiments shown in FIG. 3 and FIGS. 5A-5B.

Figure 6:
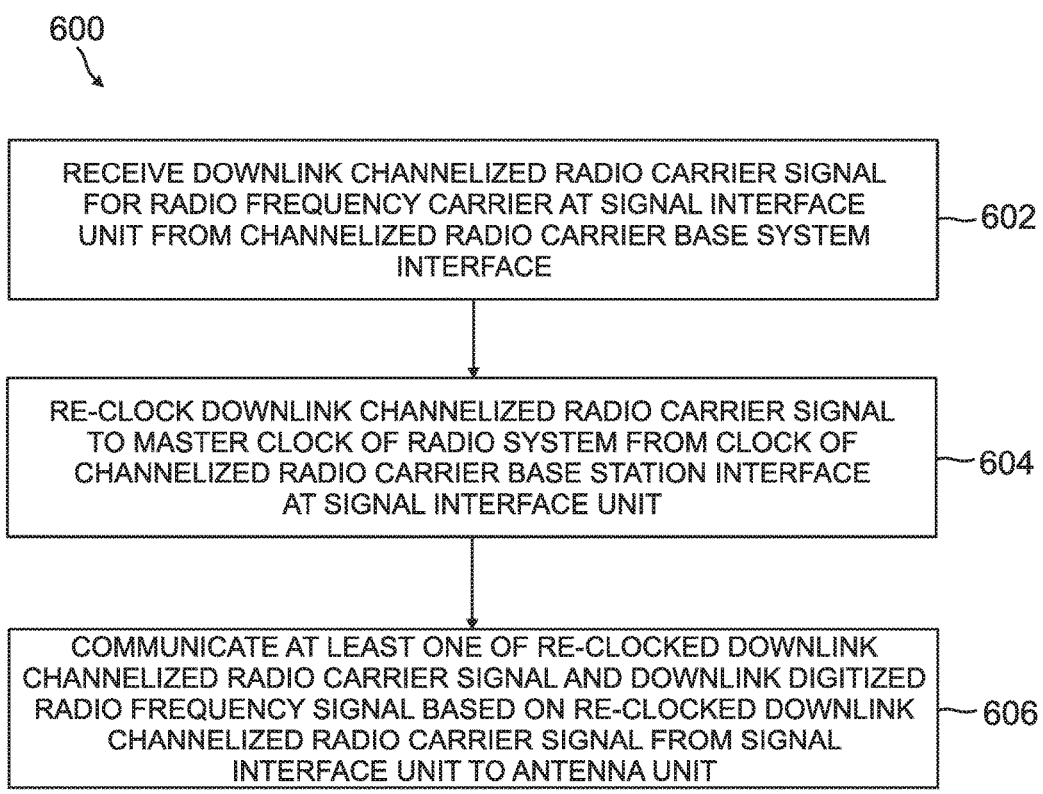
FIG. 6 is a flow diagram illustrating one exemplary embodiment of a method for re-clocking a downlink channelized radio carrier at a signal interface unit.

FIG. 6 is a flow diagram illustrating one exemplary embodiment of a method 600 for re-clocking a downlink channelized radio carrier at a signal interface unit. Exemplary method 600 begins at block 602 with receiving a downlink channelized radio carrier signal for a radio frequency carrier at a signal interface unit from a channelized radio carrier base station interface. Exemplary method 600 proceeds to block 604 with re-clocking the downlink channelized radio carrier signal to a master clock of the radio system from a clock of the channelized radio carrier base station interface at the signal interface unit. Exemplary method 600 proceeds to block 606 with communicating at least one of the re-clocked downlink channelized radio carrier signal and a downlink digitized radio frequency signal based on the re-clocked downlink channelized radio carrier signal from the signal interface unit to the antenna unit.

Figure 7:
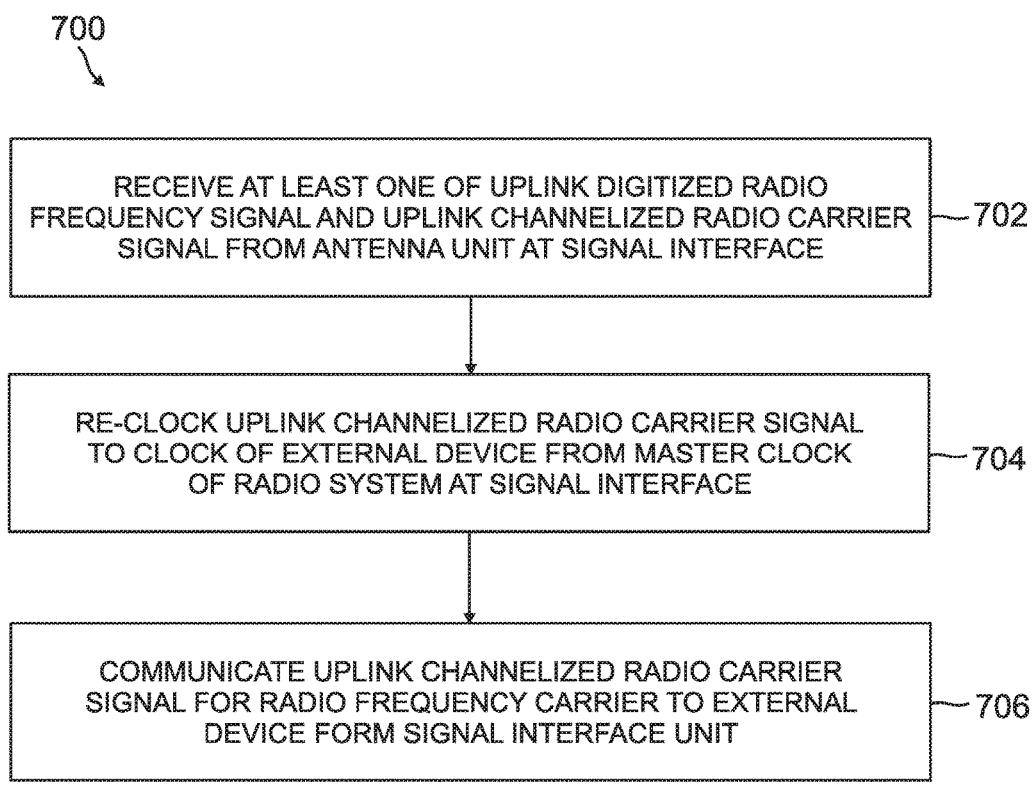
FIG. 7 is a flow diagram illustrating one exemplary embodiment of a method for re-clocking an uplink channelized radio carrier at a signal interface unit.

FIG. 7 is a flow diagram illustrating one exemplary embodiment of a method 700 for re-clocking an uplink channelized radio carrier at a signal interface unit. Exemplary method 700 begins at block 702 with receiving at least one of an uplink digitized radio frequency signal and an uplink channelized radio carrier signal from an antenna unit at a signal interface. Exemplary method 700 proceeds to block 704 with re-clocking the uplink channelized radio carrier signal to a clock of an external device from a master clock of the radio system at the signal interface. Exemplary method 700 proceeds to block 706 with communicating the uplink channelized radio carrier signal for a radio frequency carrier to the external device from the signal interface unit.

Figure 8:
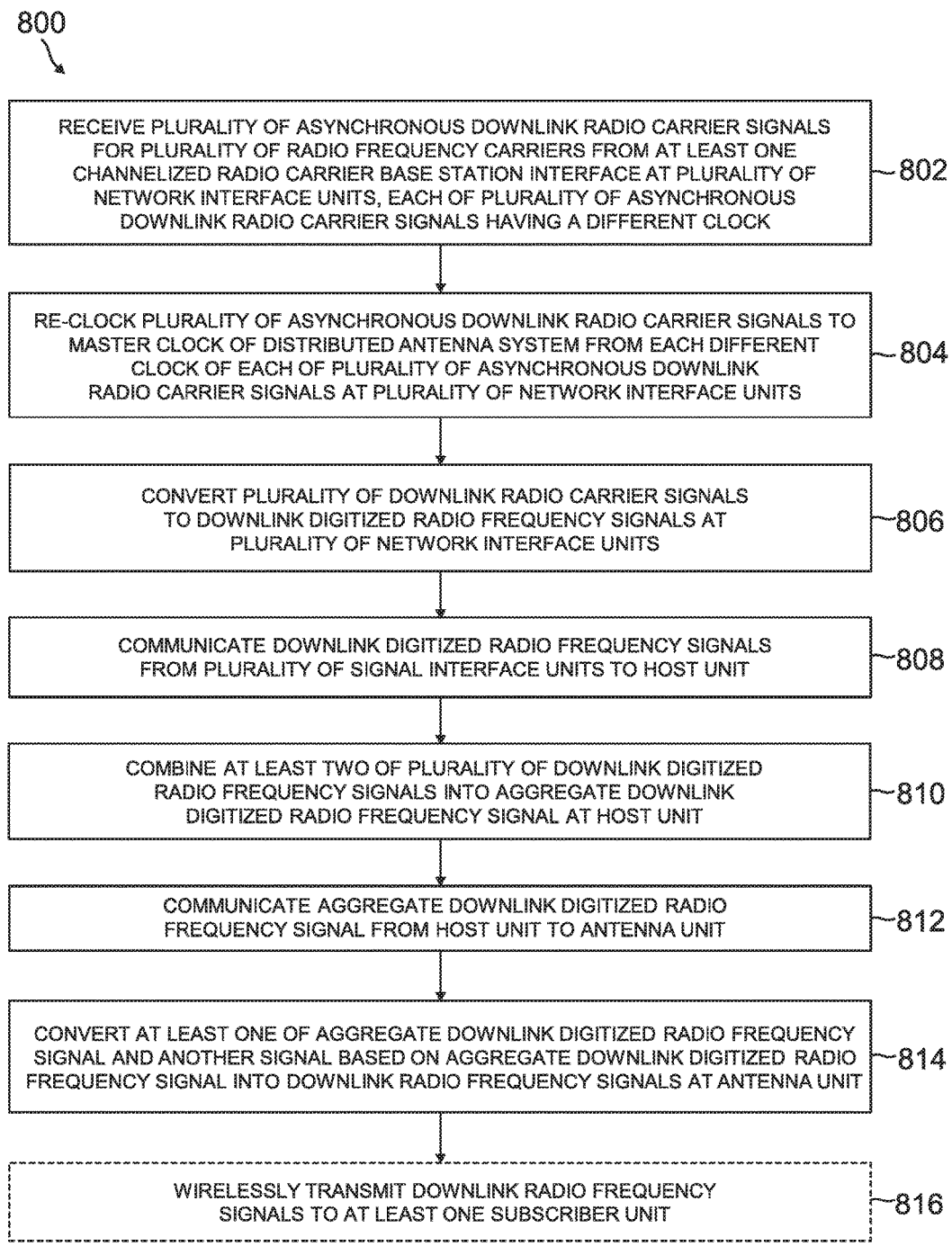
FIG. 8 is a flow diagram illustrating one exemplary embodiment of a method for interfacing a plurality of asynchronous downlink radio carrier signals in a distributed antenna system.

FIG. 8 is a flow diagram illustrating one exemplary embodiment of a method 800 for interfacing a plurality of asynchronous downlink radio carrier signals in a distributed antenna system. Exemplary method 800 begins at block 802 with receiving a plurality of asynchronous downlink radio carrier signals for a plurality of radio frequency carriers from at least one channelized radio carrier base station interface at a plurality of network interface units, each of the plurality of asynchronous downlink radio carrier signals having a different clock. Exemplary method 800 proceeds to block 804 with re-clocking the plurality of downlink asynchronous radio carrier signals to a master clock of the distributed antenna system from each different clock of each of the plurality of asynchronous downlink radio carrier signals at a plurality of network interface units. Exemplary method 800 proceeds to block 806 with converting the plurality of downlink asynchronous radio carrier signal to downlink digitized radio frequency signals at the plurality of network interface units. Exemplary method 800 proceeds to block 808 with communicating the downlink digitized radio frequency signals from the plurality of signal interface units to the host unit. Exemplary method 800 proceeds to block 810 with combining at least two of the plurality of downlink digitized radio frequency signals into an aggregate downlink digitized radio frequency signal at a host unit. Exemplary method 800 proceeds to block 812 with communicating the aggregate downlink digitized radio frequency signal from the host unit to the antenna unit. Exemplary method 800 proceeds to block 814 with converting at least one of the aggregate downlink digitized radio frequency signal and another signal based on the aggregate downlink digitized radio frequency signal into downlink radio frequency signals at the antenna unit. Exemplary method 800 proceeds to optional block 816 with wirelessly transmitting the downlink radio frequency signals to at least one subscriber unit.

Figure 9:
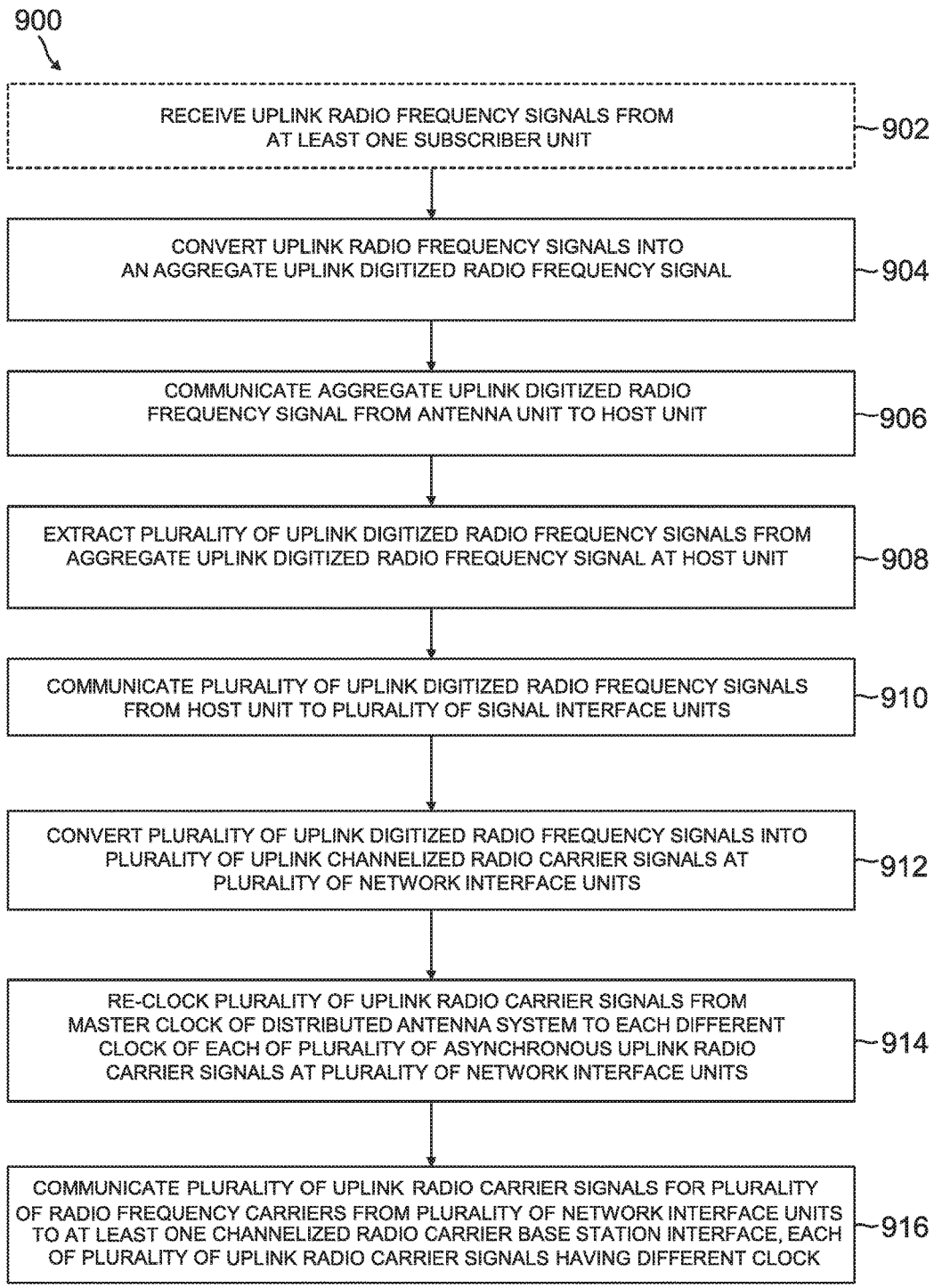
FIG. 9 is a flow diagram illustrating one exemplary embodiment of a method for interfacing a plurality of asynchronous uplink radio carrier signals in a distributed antenna system.

FIG. 9 is a flow diagram illustrating one exemplary embodiment of a method 900 for interfacing a plurality of asynchronous uplink radio carrier signals in a distributed antenna system. Exemplary method 900 begins at optional block 902 with receiving uplink radio frequency signals from at least one subscriber unit. Exemplary method 900 proceeds to block 904 with converting the uplink radio frequency signals into an aggregate uplink digitized radio frequency signal. Exemplary method 900 proceeds to block 906 with communicating the aggregate uplink digitized radio frequency signal from the antenna unit to the host unit. Exemplary method 900 proceeds to block 908 with extracting a plurality of uplink digitized radio frequency signals from the aggregate uplink digitized radio frequency signal at the host unit. Exemplary method 900 proceeds to block 910 with communicating the plurality of uplink digitized radio frequency signals from the host unit to a plurality of signal interface units. Exemplary method 900 proceeds to block 912 with converting the plurality of uplink digitized radio frequency signals into a plurality of uplink channelized radio carrier signals at a plurality of network interface units. Exemplary method 900 proceeds to block 914 with re-clocking the plurality of uplink radio carrier signals from the master clock of the distributed antenna system to each different clock of each of the plurality of asynchronous uplink radio carrier signals at the plurality of network interface units. Exemplary method 900 proceeds to block 916 with communicating the plurality of asynchronous uplink radio carriers signals for the plurality of radio frequency carriers from the plurality of network interface units to at least one channelized radio carrier base station interface, each of the plurality of asynchronous uplink radio carrier signals having a different clock.

Figure 10:
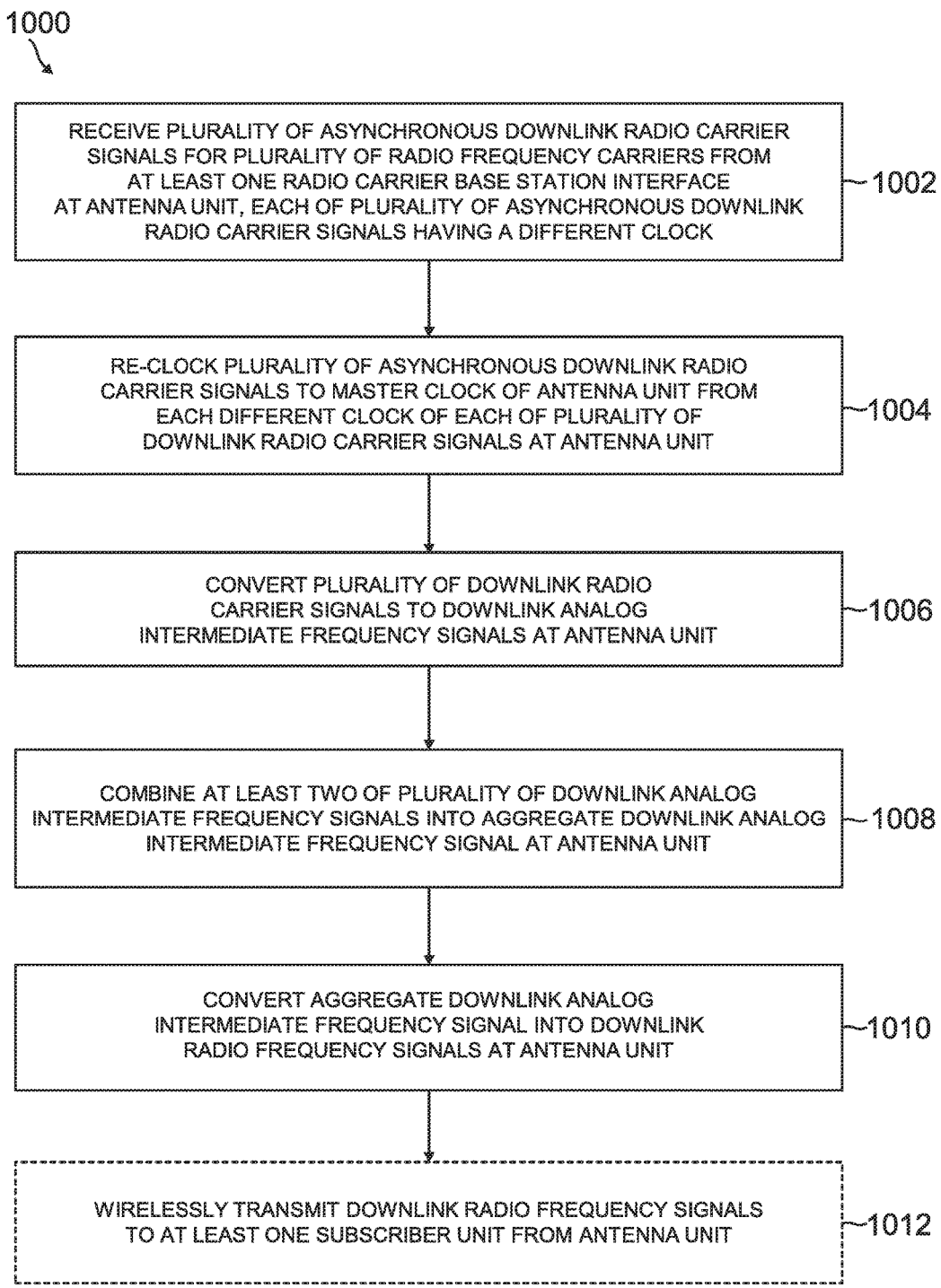
FIG. 10 is a flow diagram illustrating one exemplary embodiment of a method for interfacing a plurality of asynchronous downlink radio carrier signals at an antenna unit.

FIG. 10 is a flow diagram illustrating one exemplary embodiment of a method 1000 for interfacing a plurality of asynchronous downlink radio carrier signals at an antenna unit. Exemplary method 1000 begins at block 1002 with receiving a plurality of asynchronous downlink radio carrier signals for a plurality of radio frequency carriers form at least one radio carrier base station interface at an antenna unit, each of the plurality of asynchronous downlink radio carrier signals having a different clock. Exemplary method 1000 proceeds to block 1004 with re-clocking the plurality of downlink asynchronous radio carriers signal to a master clock of an antenna unit from each different clock of each of the plurality of asynchronous downlink radio carrier signals at the antenna unit. Exemplary method 1000 proceeds to block 1006 with converting the plurality of downlink asynchronous radio carrier signals to downlink analog intermediate frequency signals at the antenna unit. Exemplary method 1000 proceeds to block 1008 with combining at least two of the plurality of downlink analog intermediate frequency signals into an aggregate downlink analog intermediate frequency signal at the antenna unit. Exemplary method 1000 proceeds to block 1010 with converting the aggregate downlink analog intermediate frequency signal into downlink radio frequency signals at the antenna unit. Exemplary method 1000 proceeds to optional block 1012 with wirelessly transmitting downlink radio frequency signals to at least one subscriber unit from the antenna unit.

Figure 11:
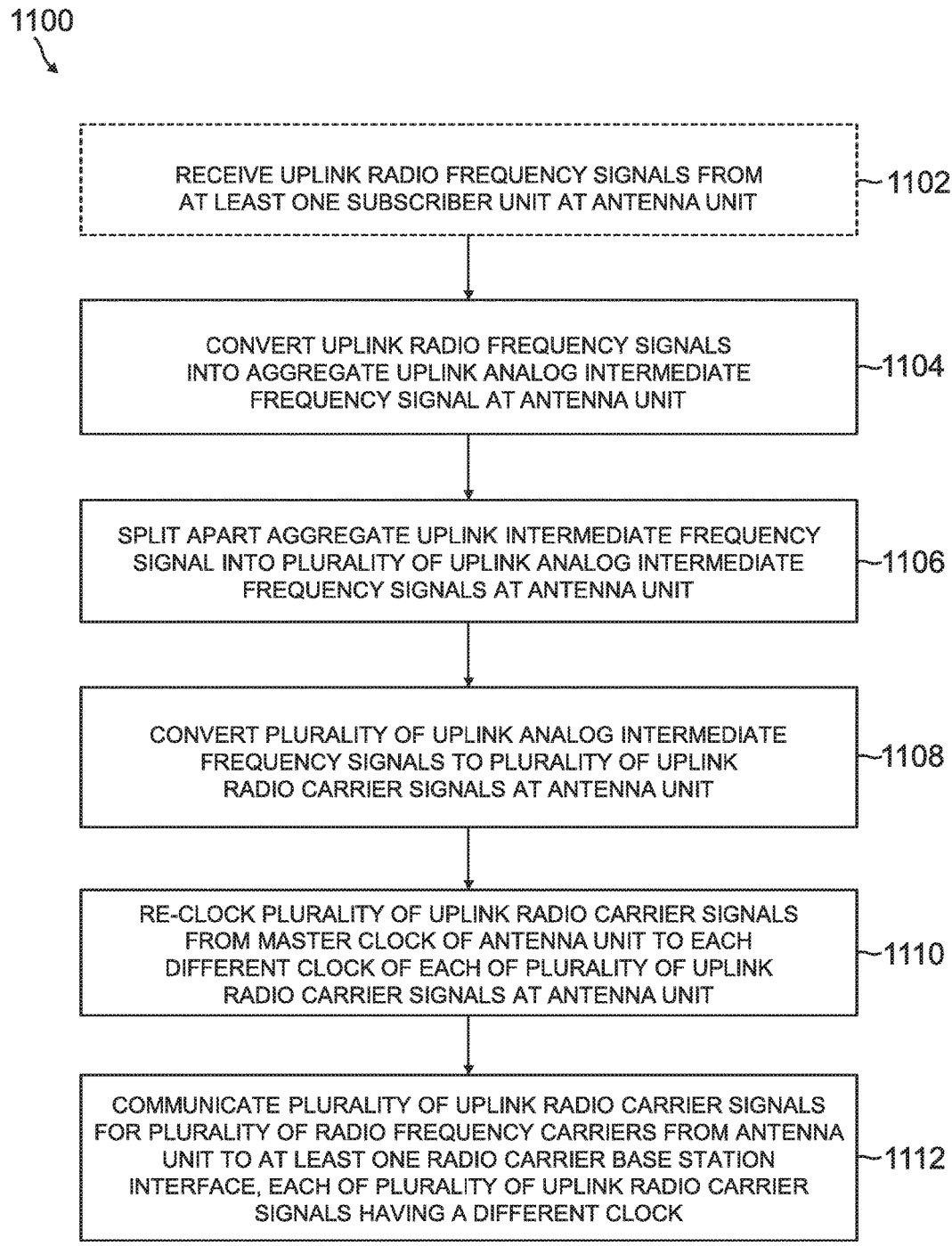
FIG. 11 is a flow diagram illustrating one exemplary embodiment of a method for interfacing a plurality of asynchronous uplink radio carrier signals at an antenna unit.

FIG. 11 is a flow diagram illustrating one exemplary embodiment of a method 1100 for interfacing a plurality of asynchronous uplink radio carrier signals at an antenna unit. Exemplary method 1100 begins at optional block 1102 with receiving uplink radio frequency signals from at least one subscriber unit. Exemplary method 1100 proceeds to block 1104 with converting uplink radio frequency signals into an aggregate uplink analog intermediate frequency signal at antenna unit. Exemplary method 1100 proceeds to block 1106 with splitting apart the aggregate uplink analog intermediate frequency signal into a plurality of uplink analog intermediate frequency signals at the antenna unit. Exemplary method 1100 proceeds to block 1108 with converting the plurality of uplink analog intermediate frequency signals to a plurality of uplink radio carrier signals at the antenna unit. Exemplary method 1100 proceeds to block 1110 with re-clocking the plurality of uplink radio carrier signals from a master clock of the antenna unit to each different clock of the plurality of asynchronous uplink radio carrier signals at the antenna unit. Exemplary method 1100 proceeds to block 1112 with communicating the plurality of asynchronous uplink radio carrier signals for the plurality of radio frequency carriers from the antenna unit to at least one radio carrier base station interface, each of the plurality of asynchronous uplink radio carrier signals having a different clock.

Any of the processors described above may include or function with software programs, firmware or other computer readable instructions for carrying out various methods, process tasks, calculations, and control functions, described herein. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a signal interface unit in a radio system, comprising: an external device interface configured to receive a downlink asynchronous radio carrier signal for a radio frequency carrier from an external device; a clock conversion unit communicatively coupled to the external device interface and configured to re-clock the downlink asynchronous radio carrier signal to a master clock of the radio system from the clock of the external device; and an antenna side interface configured to communicate at least one of the re-clocked downlink asynchronous radio carrier signal and a downlink digitized radio frequency signal based on the re-clocked downlink asynchronous radio carrier signal to an antenna unit.

Example 2 includes the signal interface unit of Example 1, wherein the clock conversion unit includes a resampling filter that re-clocks the downlink asynchronous radio carrier signal to the master clock of the radio system from the clock of the external device.

Example 3 includes the signal interface unit of any of Examples 1-2, wherein the clock conversion unit converts from a first clock domain of the external device to a second clock domain of the radio system using a Farrow structure.

Example 4 includes the signal interface unit of any of Examples 1-3, wherein the clock conversion unit is configured to re-clock the downlink asynchronous radio carrier signal by converting first samples of a channelized radio carrier synchronous with a first clock of a first clock domain to second samples synchronous with a second clock of a second clock domain.

Example 5 includes the signal interface unit of any of Examples 1-4, wherein the downlink asynchronous radio carrier signal is specific to a particular channel and requires additional baseband conversion before radio frequency conversion and transmission can be performed; and wherein the downlink digitized radio frequency signal is not specific to a particular channel and does not require additional baseband conversion before radio frequency conversion and transmission can be performed.

Example 6 includes the signal interface unit of any of Examples 1-5, wherein the downlink asynchronous radio carrier signal includes I/Q pairs.

Example 7 includes the signal interface unit of any of Examples 1-6, further comprising: a signal conversion module communicatively coupled between the external device interface and the antenna side interface and configured to generate the downlink digitized radio frequency signal based on the re-clocked downlink asynchronous radio carrier signal.

Example 8 includes the signal interface unit of any of Examples 1-7, wherein the antenna unit is a remote antenna unit communicatively coupled to the signal interface unit by at least one medium.

Example 9 includes the signal interface unit of Example 8, wherein the distributed antenna system network interface is configured to communicate the downlink digital radio frequency signal directly to the remote antenna unit across the at least one medium.

Example 10 includes the signal interface unit of any of Examples 8-9, wherein the signal interface is communicatively coupled with an intermediary device that aggregates the downlink digital radio frequency signal with at least one other downlink digital radio frequency signal before being transmitted to the remote antenna unit.

Example 11 includes the signal interface unit of Example 10, wherein individual channels within the downlink digital radio frequency signal and the at least one other downlink digital radio frequency signal do not overlap and can be upconverted together simultaneously to radio frequency spectrum.

Example 12 includes the signal interface unit of any of Examples 8-11, wherein the at least one medium includes at least one of a wired medium and a wireless medium.

Example 13 includes the signal interface unit of any of Examples 8-12, wherein the signal interface communicates at least one of digital signals and analog signals to the remote antenna unit across the at least one medium.

Example 14 includes the signal interface unit of any of Examples 1-13, wherein the external device is part of a base band unit of a base station.

Example 15 includes the signal interface unit of any of Examples 1-14, wherein the external device is at least one of a Common Public Radio Interface (CPRI) base station interface, an Open Base Station Architecture Initiative (OBSAI) base station interface, and an Open Radio Interface (ORI) interface; and wherein the downlink asynchronous radio carrier signal is formatted according to at least one of a Common Public Radio Interface (CPRI) standard, an Open Base Station Architecture Initiative (OBSAI) standard, and an Open Radio Interface (ORI) standard.

Example 16 includes the signal interface unit of any of Examples 1-15, wherein the downlink digital radio frequency signal contains a digital representation of the radio carrier positioned within a set of spectrum that reflects its eventual location within radio frequency spectrum.

Example 17 includes the signal interface unit of any of Examples 1-16, further comprising: wherein the antenna side interface is configured to receive at least one of an uplink digitized radio frequency signal and an uplink channelized radio carrier signal from the antenna unit; wherein the clock conversion unit is further configured to re-clock the uplink channelized radio carrier signal to the clock of the external device from the master clock of the radio system; and wherein the external device interface is further configured to communicate an uplink channelized radio carrier signal for the radio frequency carrier to the external device.

Example 18 includes a method comprising: receiving a downlink asynchronous radio carrier signal for a radio frequency carrier at a signal interface unit from an external device; re-clocking the downlink asynchronous radio carrier signal to a master clock of the radio system from the clock of the external device at the signal interface unit; and communicating at least one of the re-clocked downlink asynchronous radio carrier signal and a downlink digitized radio frequency signal based on the re-clocked downlink asynchronous radio carrier signal from the signal interface unit to an antenna unit.

Example 19 includes the method of Example 18, wherein re-clocking the downlink asynchronous radio carrier signal to a master clock of the radio system from the clock of the external device at the signal interface unit occurs at least in part through a resampling filter.

Example 20 includes the method of any of Examples 18-19, wherein re-clocking the downlink asynchronous radio carrier signal to a master clock of the radio system from the clock of the external device at the signal interface unit includes converting from a first clock domain of the external device to a second clock domain of the radio system using a Farrow structure.

Example 21 includes the method of any of Examples 18-20, wherein re-clocking the downlink asynchronous radio carrier signal to a master clock of the radio system from the clock of the external device at the signal interface unit includes converting first samples of a channelized radio carrier synchronous with a first clock of a first clock domain to second samples synchronous with a second clock of a second clock domain.

Example 22 includes the method of any of Examples 18-21, wherein the downlink asynchronous radio carrier signal is specific to a particular channel and requires additional baseband conversion before radio frequency conversion and transmission can be performed; and wherein the downlink digitized radio frequency signal is not specific to a particular channel and does not require additional baseband conversion before radio frequency conversion and transmission can be performed.

Example 23 includes the method of any of Examples 18-22, wherein the downlink asynchronous radio carrier signal includes I/Q pairs.

Example 24 includes the method of any of Examples 18-23, further comprising: generating the downlink digitized radio frequency signal based on the re-clocked downlink asynchronous radio carrier signal.

Example 25 includes the method of any of Examples 18-24, wherein the antenna unit is a remote antenna unit communicatively coupled to the signal interface unit by at least one medium.

Example 26 includes the method of Example 25, wherein communicating the at least one of the re-clocked downlink asynchronous radio carrier signal and a downlink digitized radio frequency signal based on the re-clocked downlink asynchronous radio carrier signal from the signal interface unit to an antenna unit occurs across the at least one medium.

Example 27 includes the method of any of Examples 25-26, further comprising aggregating the downlink digital radio frequency signal with at least one other downlink digital radio frequency signal at an intermediary device communicatively coupled between the signal interface and the remote antenna unit before being transmitted to the remote antenna unit.

Example 28 includes the method of Example 27, wherein individual channels within the downlink digital radio frequency signal and the at least one other downlink digital radio frequency signal do not overlap and can be upconverted together simultaneously to radio frequency spectrum.

Example 29 includes the method of any of Examples 18-28, wherein the external device is part of a base band unit of a base station.

Example 30 includes the method of any of Examples 18-29, wherein the external device is at least one of a Common Public Radio Interface (CPRI) base station interface, an Open Base Station Architecture Initiative (OBSAI) base station interface, and an Open Radio Interface (ORI) interface; and wherein the downlink asynchronous radio carrier signal is formatted according to at least one of a Common Public Radio Interface (CPRI) standard, an Open Base Station Architecture Initiative (OBSAI) standard, and an Open Radio Interface (ORI) standard.

Example 31 includes the method of any of Examples 18-30, wherein the downlink digital radio frequency signal contains a digital representation of the radio carrier positioned within a set of spectrum that reflects its eventual location within radio frequency spectrum.

Example 32 includes the method of any of Examples 18-31, further comprising: receiving at least one of an uplink digitized radio frequency signal and an uplink channelized radio carrier signal from the antenna unit at the signal interface; re-clocking the uplink channelized radio carrier signal to the clock of the external device from the master clock of the radio system at the signal interface; and communicating an uplink channelized radio carrier signal for the radio frequency carrier to the external device from the signal interface unit.

Example 33 includes a distributed antenna system, comprising: a plurality of signal interface units configured to receive a plurality of downlink asynchronous radio carrier signals for a plurality of radio frequency carriers from at least one external device, each of the plurality of downlink asynchronous radio carrier signals having a different clock; wherein the plurality of signal interface units is further configured to re-clock the plurality of downlink asynchronous radio carrier signals to a master clock of the distributed antenna system from each different clock of each of the plurality of downlink asynchronous radio carrier signal; wherein the plurality of signal interface units is further configured to convert the plurality of downlink asynchronous radio carrier signals to downlink digitized radio frequency signals; a host unit communicatively coupled to the plurality of signal interface units and configured to combine at least two of the plurality of downlink digitized radio frequency signals into an aggregate downlink digitized radio frequency signal; an antenna unit communicatively coupled to the host unit and configured to receive the aggregate downlink digitized radio frequency signal from the host unit; wherein the antenna unit is further configured to convert at least one of the aggregate downlink digitized radio frequency signal and another signal based on the aggregate downlink digitized radio frequency signal into downlink radio frequency signals; wherein the antenna unit is further configured to wirelessly transmit the downlink radio frequency signals to at least one subscriber unit.

Example 34 includes the distributed antenna system of Example 33, wherein the plurality of signal interface units includes at least one resampling filter that re-clocks the plurality of downlink asynchronous radio carrier signals to the master clock of the remote antenna unit from each different clock of each of the plurality of downlink asynchronous radio carrier signal.

Example 35 includes the distributed antenna system of any of Examples 33-34, wherein the plurality of signal interface units is configured to convert from first clock domains of the external devices to a second clock domain of the remote antenna unit using a Farrow structure.

Example 36 includes the distributed antenna system of any of Examples 33-35, wherein at least one of the plurality of signal interface units is configured to re-clock at least one downlink asynchronous radio carrier signal by converting first samples of a channelized radio carrier synchronous with a first clock of a first clock domain to second samples synchronous with a second clock of a second clock domain.

Example 37 includes the distributed antenna system of any of Examples 33-36, wherein at least one of the plurality of downlink asynchronous radio carrier signals is specific to a particular channel and requires additional baseband conversion before radio frequency conversion and transmission can be performed; and wherein the aggregate downlink analog intermediate frequency signal is not specific to a particular channel and does not require additional baseband conversion before radio frequency conversion and transmission can be performed.

Example 38 includes the distributed antenna system of any of Examples 33-37, wherein at least one of the downlink asynchronous radio carrier signals includes I/Q pairs.

Example 39 includes the distributed antenna system of any of Examples 33-38, wherein individual channels within the at least two of the plurality of downlink analog intermediate frequency signals do not overlap and can be upconverted together simultaneously to radio frequency spectrum once combined into the aggregate downlink analog intermediate frequency signal.

Example 40 includes the distributed antenna system of any of Examples 33-39, wherein at least one of the plurality of external devices is a baseband processing unit of a base station.

Example 41 includes the distributed antenna system of any of Examples 33-40, wherein at least one of the plurality of downlink asynchronous radio carrier signals received at the plurality of signal interface units uses at least one of a SONET protocol and an Ethernet protocol to receive I/Q pairs.

Example 42 includes the distributed antenna system of any of Examples 33-41, wherein at least one of the plurality of network interfaces is at least one of a Common Public Radio Interface (CPRI) base station interface, an Open Base Station Architecture Initiative (OBSAI) base station interface, and an Open Radio Interface (ORI) interface; and wherein at least one of the downlink asynchronous radio carrier signal is formatted according to at least one of a Common Public Radio Interface (CPRI) standard, an Open Base Station Architecture Initiative (OBSAI) standard, and an Open Radio Interface (ORI) standard.

Example 43 includes the distributed antenna system of any of Examples 33-42, wherein at least one of the downlink asynchronous radio carrier signal contains a digital representation of a radio carrier positioned within a set of spectrum that reflects its eventual location within radio frequency spectrum.

Example 44 includes the distributed antenna system of any of Examples 33-43, further comprising: wherein the plurality of signal interface units is further configured to convert a plurality of uplink digitized radio frequency signals to uplink asynchronous radio carrier signals at least in part by re-clocking a plurality of the uplink digitized radio frequency signals to a plurality of asynchronous clocks, different from the master clock of the distributed antenna system.

Example 45 includes a method for interfacing a plurality of asynchronous downlink asynchronous radio carrier signal in a distributed antenna system, comprising: receiving a plurality of downlink asynchronous radio carrier signals for a plurality of radio frequency carriers at a plurality of signal interface units from at least one external device, each of the plurality of downlink asynchronous radio carrier signals having a different clock; re-clocking the plurality of downlink asynchronous radio carrier signals to a master clock of the distributed antenna system from each different clock of each of the plurality of downlink asynchronous radio carrier signals at the plurality of signal interface units; converting the plurality of downlink asynchronous radio carrier signals to downlink digitized radio frequency signals at the plurality of signal interface units; communicating the downlink digitized radio frequency signals from the plurality of signal interface units to a host unit; combining at least two of the plurality of downlink digitized radio frequency signals into an aggregate downlink digitized radio frequency signal at the host unit; communicating the aggregate downlink digitized radio frequency signal from the host unit to an antenna unit; and converting at least one of the aggregate downlink digitized radio frequency signal and another signal based on the aggregate downlink digitized radio frequency signal into downlink radio frequency signals at the antenna unit.

Example 46 includes the method of Example 45, further comprising: wirelessly transmitting the downlink radio frequency signals to at least one subscriber unit.

Example 47 includes the method of any of Examples 45-46, wherein re-clocking the plurality of downlink asynchronous radio carrier signals to the master clock of the antenna unit from each different clock of each of the plurality of downlink asynchronous radio carrier signals at the antenna unit occurs through at least one resampling filter.

Example 48 includes the method of any of Examples 45-47, wherein re-clocking the plurality of downlink asynchronous radio carrier signals to the master clock of the antenna unit converts the plurality of downlink asynchronous radio carrier signals from first clock domains of the plurality of channelized radio carrier signals to a second clock domain of the antenna unit using a Farrow structure.

Example 49 includes the method of any of Examples 45-48, wherein re-clocking the plurality of downlink asynchronous radio carrier signals to the master clock of the antenna unit includes converting first samples of a channelized radio carrier synchronous with a first clock of a first clock domain to second samples synchronous with a second clock of a second clock domain.

Example 50 includes the method of any of Examples 45-49, wherein each of the plurality of downlink asynchronous radio carrier signals is specific to a particular channel and requires additional baseband conversion before radio frequency conversion and transmission can be performed; and wherein the aggregate downlink analog intermediate frequency signal is not specific to a particular channel and does not require additional baseband conversion before radio frequency conversion and transmission can be performed.

Example 51 includes the method of any of Examples 45-50, wherein each of the downlink asynchronous radio carrier signal includes I/Q pairs.

Example 52 includes the method of any of Examples 45-51, wherein individual channels within the at least two of the plurality of downlink analog intermediate frequency signals do not overlap and can be upconverted together simultaneously to radio frequency spectrum once combined into the aggregate downlink analog intermediate frequency signal.

Example 53 includes the method of any of Examples 45-52, wherein at least one of the plurality of external devices is at least one of a baseband processing unit of a base station.

Example 54 includes the method of any of Examples 45-53, wherein receiving at least one of the plurality of downlink asynchronous radio carrier signals for the plurality of radio frequency carriers occurs using at least one of a SONET protocol and an Ethernet protocol to transmit I/Q pairs.

Example 55 includes the method of any of Examples 45-54, wherein at least one of the plurality of network interfaces is at least one of a Common Public Radio Interface (CPRI) base station interface, an Open Base Station Architecture Initiative (OBSAI) base station interface, and an Open Radio Interface (ORI) interface; and wherein at least one of the downlink asynchronous radio carrier signal is formatted according to at least one of a Common Public Radio Interface (CPRI) standard, an Open Base Station Architecture Initiative (OBSAI) standard, and an Open Radio Interface (ORI) standard.

Example 56 includes the method of any of Examples 45-55, wherein at least one of the downlink asynchronous radio carrier signal contains a digital representation of a radio carrier positioned within a set of spectrum that reflects its eventual location within radio frequency spectrum.

Example 57 includes the method of any of Examples 45-56, further comprising: converting a plurality of uplink digitized radio frequency signals to uplink asynchronous radio carrier signals at the plurality of signal interface units at least in part by re-clocking a plurality of the uplink digitized radio frequency signals to a plurality of asynchronous clocks, different from the master clock of the distributed antenna system.

Example 58 includes a remote antenna unit, comprising: a plurality of network interfaces configured to receive a plurality of downlink asynchronous radio carrier signals for a plurality of radio frequency carriers from at least one external device, each of the plurality of downlink asynchronous radio carrier signals having a different clock; at least one clock conversion unit communicatively coupled to the plurality of external device interfaces and configured to re-clock the plurality of downlink asynchronous radio carrier signals to a master clock of the remote antenna unit from each different clock of each of the plurality of downlink asynchronous radio carrier signal; at least one intermediate frequency convertor communicatively coupled to the at least one clock conversion unit and configured to convert the plurality of downlink asynchronous radio carrier signals to downlink analog intermediate frequency signals; at least one switching unit communicatively coupled to the at least one intermediate frequency convertor and configured to combine at least two of the plurality of downlink analog intermediate frequency signals into an aggregate downlink analog intermediate frequency signal; at least one radio frequency converter communicatively coupled to the at least one intermediate frequency converter and configured to convert the aggregate downlink analog intermediate frequency signal into a downlink radio frequency signal; at least one antenna communicatively coupled to the at least one radio frequency converter and configured to wireless transmit the downlink radio frequency signals to at least one subscriber unit.

Example 59 includes the remote antenna unit of Example 58, wherein the at least one clock conversion unit includes at least one resampling filter that re-clocks the plurality of downlink asynchronous radio carrier signals to the master clock of the remote antenna unit from each different clock of each of the plurality of downlink asynchronous radio carrier signal.

Example 60 includes the remote antenna unit of any of Examples 58-59, wherein the at least one clock conversion unit converts from a first clock domain of an external device to a second clock domain of the remote antenna unit using a Farrow structure.

Example 61 includes the remote antenna unit of any of Examples 58-60, wherein the at least one clock conversion unit is configured to re-clock the plurality of downlink asynchronous radio carrier signals by converting first samples of a channelized radio carrier synchronous with a first clock of a first clock domain to second samples synchronous with a second clock of a second clock domain.

Example 62 includes the remote antenna unit of any of Examples 58-61, wherein the each of the plurality of downlink asynchronous radio carrier signals is specific to a particular channel and requires additional baseband conversion before radio frequency conversion and transmission can be performed; and wherein the aggregate downlink analog intermediate frequency signal is not specific to a particular channel and does not require additional baseband conversion before radio frequency conversion and transmission can be performed.

Example 63 includes the remote antenna unit of any of Examples 58-62, wherein each of the downlink asynchronous radio carrier signals includes I/Q pairs.

Example 64 includes the remote antenna unit of any of Examples 58-63, wherein individual channels within the at least two of the plurality of downlink analog intermediate frequency signals do not overlap and can be upconverted together simultaneously to radio frequency spectrum once combined into the aggregate downlink analog intermediate frequency signal.

Example 65 includes the remote antenna unit of any of Examples 58-64, wherein at least one of the plurality of external devices is at least one of a host signal interface and an intermediary device.

Example 66 includes the remote antenna unit of any of Examples 58-65, wherein at least one of the downlink asynchronous radio carrier signal contains a digital representation of a radio carrier positioned within a set of spectrum that reflects its eventual location within radio frequency spectrum.

Example 67 includes the remote antenna unit of any of Examples 58-66, further comprising: wherein the at least one clock conversion unit is further configured to convert a plurality of uplink digitized radio frequency signals to uplink asynchronous radio carrier signals at least in part by re-clocking a plurality of uplink digitized radio frequency signals to a plurality of asynchronous clocks, different from the master clock of the remote antenna unit.

Example 68 includes the remote antenna unit of Example 67, wherein downlink and uplink signals within a radio frequency band are in distinct spectrum and are separated in frequency using a Frequency Division Duplexing (FDD) scheme.

Example 69 includes the remote antenna unit of any of Examples 67-68, wherein downlink and uplink signals within a radio frequency band overlap in spectrum and are separated in time using a Time Division Duplexing (TDD) scheme.

Example 70 includes a method for interfacing a plurality of asynchronous downlink asynchronous radio carrier signal at an antenna unit, comprising: receiving a plurality of downlink asynchronous radio carrier signals for a plurality of radio frequency carriers from at least one external device at the antenna unit, each of the plurality of downlink asynchronous radio carrier signals having a different clock; re-clocking the plurality of downlink asynchronous radio carrier signals to a master clock of the antenna unit from each different clock of each of the plurality of downlink asynchronous radio carrier signals at the antenna unit; converting the plurality of downlink asynchronous radio carrier signals to downlink analog intermediate frequency signals at the antenna unit; combining at least two of the plurality of downlink analog intermediate frequency signals into an aggregate downlink analog intermediate frequency signal at the antenna unit; converting the aggregate downlink analog intermediate frequency signal into downlink radio frequency signals at the antenna unit; wirelessly transmitting the downlink radio frequency signals from the antenna unit to at least one subscriber unit.

Example 71 includes the method of Example 70, wherein re-clocking the plurality of downlink asynchronous radio carrier signals to the master clock of the antenna unit from each different clock of each of the plurality of downlink asynchronous radio carrier signals at the antenna unit occurs through a at least one resampling filter.

Example 72 includes the method of any of Examples 70-71, wherein re-clocking the plurality of downlink asynchronous radio carrier signals to the master clock of the antenna unit converts the plurality of downlink asynchronous radio carrier signals from first clock domains of the plurality of channelized radio carrier signals to a second clock domain of the antenna unit using a Farrow structure.

Example 73 includes the method of any of Examples 70-72, wherein re-clocking the plurality of downlink asynchronous radio carrier signals to the master clock of the antenna unit includes converting first samples of a channelized radio carrier synchronous with a first clock of a first clock domain to second samples synchronous with a second clock of a second clock domain.

Example 74 includes the method of any of Examples 70-73, wherein each of the plurality of downlink asynchronous radio carrier signals is specific to a particular channel and requires additional baseband conversion before radio frequency conversion and transmission can be performed; and wherein the aggregate downlink analog intermediate frequency signal is not specific to a particular channel and does not require additional baseband conversion before radio frequency conversion and transmission can be performed.

Example 75 includes the method of any of Examples 70-74, wherein each of the downlink asynchronous radio carrier signal includes I/Q pairs.

Example 76 includes the method of any of Examples 70-75, wherein individual channels within the at least two of the plurality of downlink analog intermediate frequency signals do not overlap and can be upconverted together simultaneously to radio frequency spectrum once combined into the aggregate downlink analog intermediate frequency signal.

Example 77 includes the method of any of Examples 70-76, wherein at least one of the plurality of external devices is at least one of a host signal interface and an intermediary device.

Example 78 includes the method of any of Examples 70-77, wherein at least one of the downlink asynchronous radio carrier signal contains a digital representation of a radio carrier positioned within a set of spectrum that reflects its eventual location within radio frequency spectrum.

Example 79 includes the method of any of Examples 70-78, further comprising: converting a plurality of uplink digitized radio frequency signals to uplink asynchronous radio carrier signals at the at least one clock conversion unit at least in part by re-clocking a plurality of uplink digitized radio frequency signals to a plurality of asynchronous clocks, different from the master clock of the remote antenna unit.

What is claimed is:

1. A distributed antenna system, comprising:
a plurality of signal interface circuits configured to receive a plurality of downlink asynchronous radio carrier signals for a plurality of radio frequency carriers from at least one external device, each of the plurality of downlink asynchronous radio carrier signals having a different clock;
wherein the plurality of signal interface circuits is further configured to re-clock the plurality of downlink asynchronous radio carrier signals to a master clock of the distributed antenna system from each different clock of each of the plurality of downlink asynchronous radio carrier signals;
wherein the plurality of signal interface circuits is further configured to convert the re-clocked plurality of downlink asynchronous radio carrier signals to downlink digital signals;
a host circuit communicatively coupled to the plurality of signal interface circuits and configured to combine at least two of the downlink digital signals into an aggregate downlink digital signal;
an antenna circuit communicatively coupled to the host circuit and configured to receive the aggregate downlink digital signal from the host circuit;
wherein the antenna circuit is further configured to convert at least one of the aggregate downlink digital signal and another signal based on the aggregate downlink digital signal into downlink radio frequency signals;
wherein the antenna circuit is further configured to wirelessly transmit the downlink radio frequency signals to at least one subscriber unit.

2. The distributed antenna system of claim 1, wherein the plurality of signal interface circuits includes at least one resampling filter that re-clocks the plurality of downlink asynchronous radio carrier signals to the master clock of the distributed antenna system from each different clock of each of the plurality of downlink asynchronous radio carrier signals.

3. The distributed antenna system of claim 1, wherein the at least one external device includes a plurality of external devices, wherein the plurality of signal interface circuits is configured to convert from first clock domains of the plurality of external devices to a second clock domain of the antenna circuit using a Farrow structure.

4. The distributed antenna system of claim 1, wherein at least one of the plurality of signal interface circuits is configured to re-clock at least one downlink asynchronous radio carrier signal by converting first samples of a channelized radio carrier synchronous with a first clock of a first clock domain to second samples synchronous with a second clock of a second clock domain.

5. The distributed antenna system of claim 1, wherein at least one of the plurality of downlink asynchronous radio carrier signals is specific to a particular channel and requires additional baseband conversion before radio frequency conversion and transmission is performed; and
wherein the aggregate downlink digital signal is not specific to a particular channel and does not require additional baseband conversion before radio frequency conversion and transmission is performed.

6. The distributed antenna system of claim 1, wherein at least one of the downlink asynchronous radio carrier signals includes I/Q pairs.

7. The distributed antenna system of claim 1, wherein individual channels within the at least two of the downlink digital signals do not overlap and are upconverted together simultaneously to radio frequency spectrum once combined into the aggregate downlink digital signal.

8. The distributed antenna system of claim 1, wherein one or more of the at least one external device is a baseband processing unit of a base station.

9. The distributed antenna system of claim 1, wherein at least one of the plurality of downlink asynchronous radio carrier signals received at the plurality of signal interface circuits uses at least one of a Synchronous Optical Networking (SONET) protocol and an Ethernet protocol to receive I/Q pairs.

10. The distributed antenna system of claim 1, wherein at least one of the plurality of signal interface circuits includes at least one of a Common Public Radio Interface (CPRI) base station interface, an Open Base Station Architecture Initiative (OBSAI) base station interface, and an Open Radio Interface (ORI) interface; and
wherein at least one of the plurality of downlink asynchronous radio carrier signals is formatted according to at least one of a Common Public Radio Interface (CPRI) standard, an Open Base Station Architecture Initiative (OBSAI) standard, and an Open Radio Interface (ORI) standard.

11. The distributed antenna system of claim 1, wherein at least one of the plurality of downlink asynchronous radio carrier signals contains a digital representation of a radio carrier positioned within a set of spectrum that reflects the eventual location of the radio carrier within radio frequency spectrum.

12. The distributed antenna system of claim 1, further comprising:
wherein the plurality of signal interface circuits is further configured to convert a plurality of uplink digital signals to uplink asynchronous radio carrier signals at least in part by re-clocking a plurality of the uplink digital signals to a plurality of asynchronous clocks, different from the master clock of the distributed antenna system.

13. A method for interfacing a plurality of asynchronous downlink asynchronous radio carrier signals in a distributed antenna system, comprising:
receiving a plurality of downlink asynchronous radio carrier signals for a plurality of radio frequency carriers at a plurality of signal interface circuits from at least one external device, each of the plurality of downlink asynchronous radio carrier signals having a different clock;
re-clocking the plurality of downlink asynchronous radio carrier signals to a master clock of the distributed antenna system from each different clock of each of the plurality of downlink asynchronous radio carrier signals at the plurality of signal interface circuits;
converting the re-clocked plurality of downlink asynchronous radio carrier signals to downlink digital signals at the plurality of signal interface circuits;
communicating the downlink digital signals from the plurality of signal interface circuits to a host circuit;
combining at least two of the downlink digital signals into an aggregate downlink digital signal at the host circuit;
communicating the aggregate downlink digital signal from the host circuit to an antenna circuit; and
converting at least one of the aggregate downlink digital signal and another signal based on the aggregate downlink digital signal into downlink radio frequency signals at the antenna circuit.

14. The method of claim 13, further comprising:
wirelessly transmitting the downlink radio frequency signals to at least one subscriber unit.

15. The method of claim 13, wherein re-clocking the plurality of downlink asynchronous radio carrier signals to the master clock of the distributed antenna system from each different clock of each of the plurality of downlink asynchronous radio carrier signals at the antenna circuit occurs through at least one resampling filter.

16. The method of claim 13, wherein the at least one external device includes a plurality of external devices, wherein re-clocking the plurality of downlink asynchronous radio carrier signals to the master clock of the distributed antenna system converts the plurality of downlink asynchronous radio carrier signals from first clock domains of the plurality of external devices to a second clock domain of the antenna circuit using a Farrow structure.

17. The method of claim 13, wherein re-clocking the plurality of downlink asynchronous radio carrier signals to the master clock of the distributed antenna system includes converting first samples of a channelized radio carrier synchronous with a first clock of a first clock domain to second samples synchronous with a second clock of a second clock domain.

18. The method of claim 13, wherein each of the plurality of downlink asynchronous radio carrier signals is specific to a particular channel and requires additional baseband conversion before radio frequency conversion and transmission is performed; and
wherein the aggregate downlink digital signal is not specific to a particular channel and does not require additional baseband conversion before radio frequency conversion and transmission is performed.

19. The method of claim 13, wherein each of the downlink asynchronous radio carrier signals includes I/Q pairs.

20. The method of claim 13, wherein individual channels within the at least two of the plurality of downlink digital signals do not overlap and are upconverted together simultaneously to radio frequency spectrum once combined into the aggregate downlink digital signal.

21. The method of claim 13, wherein one or more of the at least one external device is at least one of a baseband processing unit of a base station.

22. The method of claim 13, wherein receiving at least one of the plurality of downlink asynchronous radio carrier signals for the plurality of radio frequency carriers occurs using at least one of a Synchronous Optical Networking (SONET) protocol and an Ethernet protocol to transmit I/Q pairs.

23. The method of claim 13, wherein at least one of the plurality of signal interface circuits includes at least one of a Common Public Radio Interface (CPRI) base station interface, an Open Base Station Architecture Initiative (OBSAI) base station interface, and an Open Radio Interface (ORI) interface; and
wherein at least one of the plurality of downlink asynchronous radio carrier signals is formatted according to at least one of a Common Public Radio Interface (CPRI) standard, an Open Base Station Architecture Initiative (OBSAI) standard, and an Open Radio Interface (ORI) standard.

24. The method of claim 13, wherein at least one of the plurality of downlink asynchronous radio carrier signals contains a digital representation of a radio carrier positioned within a set of spectrum that reflects the eventual location of the radio carrier within radio frequency spectrum.

25. The method of claim 13, further comprising:
converting a plurality of uplink digital signals to uplink asynchronous radio carrier signals at the plurality of signal interface circuits at least in part by re-clocking a plurality of the uplink digital signals to a plurality of asynchronous clocks, different from the master clock of the distributed antenna system.

* * * * *